(12) United States Patent
Okazaki

(10) Patent No.: US 7,558,647 B2
(45) Date of Patent: Jul. 7, 2009

(54) DEVICE AND METHOD FOR CONTROLLING ROBOT ARM, ROBOT AND PROGRAM BASED ON OBJECT-DEPENDENT IMPEDANCE

(75) Inventor: Yasunao Okazaki, Shiga (JP)

(73) Assignee: Panasonic Corporation, Osaka (JP)

( * ) Notice: Subject to any disclaimer, the term of this patent is extended or adjusted under 35 U.S.C. 154(b) by 107 days.

(21) Appl. No.: 11/919,578

(22) PCT Filed: Dec. 12, 2006

(86) PCT No.: PCT/JP2006/324741

§ 371 (c)(1),
(2), (4) Date: Oct. 30, 2007

(87) PCT Pub. No.: WO2007/080733

PCT Pub. Date: Jul. 19, 2007

(65) Prior Publication Data

US 2009/0105880 A1 Apr. 23, 2009

(30) Foreign Application Priority Data

Jan. 13, 2006 (JP) .............................. 2006-005712

(51) Int. Cl.
*G05B 21/00* (2006.01)
(52) U.S. Cl. .................... 700/260; 700/28; 700/34; 700/61; 700/213; 700/245; 700/250; 700/253; 700/254; 700/258; 700/261; 318/568.14; 318/568.17; 318/568.21; 318/568.22; 414/1; 414/2; 414/7; 901/1; 901/2; 901/9; 901/14; 901/16; 901/19; 901/20; 901/33; 901/46

(58) Field of Classification Search ............ 700/28, 700/34, 61, 250, 253, 254, 258, 260, 261; 318/568.14, 568.17, 568.21, 568.22; 901/1, 901/2, 9, 14, 16, 19, 20, 33, 46; 414/1, 2, 414/7
See application file for complete search history.

(56) References Cited

U.S. PATENT DOCUMENTS 5,442,269 A * 8/1995 Takayama et al. ...... 318/568.11
(Continued)

FOREIGN PATENT DOCUMENTS

JP 5-150836 6/1993
(Continued)

OTHER PUBLICATIONS

Caccavale et al., Robot Impedance Control and Nondiagonal Stiffness, IEEE, vol. 33, No. 10, Oct. 1999.*
(Continued)

*Primary Examiner*—Khoi Tran
*Assistant Examiner*—Nikhil Sriraman
(74) *Attorney, Agent, or Firm*—Wenderoth, Lind & Ponack, L.L.P.

(57) ABSTRACT

In a robot arm controlling device, a mechanical impedance set value of the arm is set by an object property-concordant impedance setting device based on information of an object property database in which information associated with properties of an object being gripped by the arm is recorded, and a mechanical impedance value of the arm is controlled to the set mechanical impedance set value by an impedance controlling device.

6 Claims, 12 Drawing Sheets

U.S. PATENT DOCUMENTS

| | | | | |
|---|---|---|---|---|
| 5,915,073 A | * | 6/1999 | Maeda | 700/245 |
| RE36,929 E | * | 10/2000 | Takayama et al. | 318/568.11 |
| 6,522,952 B1 | * | 2/2003 | Arai et al. | 700/258 |
| 6,654,665 B2 | * | 11/2003 | Arai et al. | 700/258 |
| 7,415,321 B2 | * | 8/2008 | Okazaki et al. | 700/245 |
| 7,443,115 B2 | * | 10/2008 | Okamoto et al. | 318/100 |
| 2003/0135303 A1 | * | 7/2003 | Arai et al. | 700/245 |

FOREIGN PATENT DOCUMENTS

| | | |
|---|---|---|
| JP | 5-305591 | 11/1993 |
| JP | 7-251389 | 10/1995 |
| JP | 8-1559 | 1/1996 |
| JP | 10-329071 | 12/1998 |
| JP | 2004-195576 | 7/2004 |
| JP | 2004-280195 | 10/2004 |
| JP | 2005-088140 | 4/2005 |

OTHER PUBLICATIONS

Machine Translation of Hideaki et al., Assembling Robot, JP Pub No. 05-305591.*

International Search Report issued Mar. 13, 2007 in the International (PCT) Application of which the present application is the U.S. National Stage.

* cited by examiner

| ID | PHYSICAL PROPERTY ||| ATTRIBUTE | NAME |
|------|--------|-----------|----------|-------------------|-------------|
|      | WEIGHT | DIMENSION | HARDNESS | DEGREE OF DANGER |             |
| 0001 | 0.5    | 0.3       | 4        | 5                | KITCHEN KNIFE |
| 0002 | 0.8    | 0.45      | 4        | 3                | PAN         |
| 0003 | 0.1    | 0.2       | 5        | 3                | GLASS CUP   |
| 0004 | 0.03   | 0.2       | 1        | 1                | TOWEL       |
| 0005 | 3.0    | 0.4       | 2        | 3                | RICE (BAG)  |
| 0006 | 0.5    | 1.5       | 3        | 2                | BROOM       |
| ⋮    | ⋮      | ⋮         | ⋮        | ⋮                | ⋮           |

| POSITION MAINTENANCE | ORIENTATION MAINTENANCE | HEIGHT MAINTENANCE |
|---|---|---|
| 0 | 1 | 0 |

| POSITION MAINTENANCE | | | | | | ORIENTATION MAINTENANCE | | | | | |
|---|---|---|---|---|---|---|---|---|---|---|---|
| x | | y | | z | | $\phi$ | | $\theta$ | | $\psi$ | |
| + | − | + | − | + | − | + | − | + | − | + | − |
| 1 | 0 | 0 | 0 | 1 | 1 | 0 | 0 | 1 | 0 | 0 | 0 |

DEVICE AND METHOD FOR CONTROLLING ROBOT ARM, ROBOT AND PROGRAM BASED ON OBJECT-DEPENDENT IMPEDANCE

TECHNICAL FIELD

The present invention relates to a robot arm controlling device and controlling method for controlling the robot arm of a robot such as a household robot having a possibility of physically contacting a person, a robot equipped with the robot arm controlling device, and a robot arm controlling program.

BACKGROUND ART

In recent years, development of household robots such as pet robots has been actively carried out, and it is expected that a more practical household robot such as a household assistant robot will be put to practical use in the future. Since the household robot must be part of the household and coexist with humans, physical contact with humans is inevitable, and is thus required to be flexible in terms of safety.

To respond to such an issue, a controlling device is disclosed in Unexamined Japanese Patent Publication No. 10-329071 of patent document 1 as a background art for detecting a contacting force with a human that is applied to a robot arm, enhancing safety by making restoration force small when large force is applied to the arm, and ensuring operation accuracy by making the restoration force large when very small force is applied to the arm.

[Patent document 1] Unexamined Japanese Patent Publication No. 10-329071

DISCLOSURE OF INVENTION

Subject to be Solved by the Invention

However, in the conventional controlling device, the restoration force is merely made small when large force is applied to the robot arm, and thus in a case where the robot arm grips a tray and an object is placed on the tray, the robot arm may move when the robot arm and a human contact, thereby tilting the tray and dropping the object placed on the tray. Furthermore, if the restoration force is merely made small, in a case where the robot arm is gripping a hard object or a pointed object, the hard object or the pointed object may move through contact with a human, thereby hitting and damaging the human who has contacted the robot arm, another human nearby, or other objects such as furniture.

It is an object of the present invention to solve the issues of the conventional controlling device, and to provide a robot arm controlling device, a controlling method, a robot, and a robot arm controlling program that can realize safe robot control without damaging humans as a result of contact even when the robot arm and the humans contact, and without causing drop of a gripped object and causing damage to other humans or other objects by the movement of the robot arm by the contact.

Means for Solving the Subject

The present invention is configured in the following manner in order to achieve the above object.

According to a first aspect of the present invention, there is provided a robot arm controlling device characterized by comprising: an object property database in which information associated with a conveyance property of an object being conveyed by the robot arm is recorded; an object property-concordant impedance setting means for setting a mechanical impedance set value of the robot arm based on the information of the object property database; and an impedance controlling means for controlling a mechanical impedance value of the robot arm to the mechanical impedance set value set by the object property-concordant impedance setting means.

According to a seventeenth aspect of the present invention, there is provided a robot arm controlling method characterized by comprising: setting a mechanical impedance set value of the robot arm based on information associated with a conveyance property of an object being conveyed by the robot arm; and controlling a mechanical impedance value of the robot arm to the set mechanical impedance set value.

According to an eighteenth aspect of the present invention, there is provided a robot characterized by comprising the robot arm and the robot arm controlling device according to any one of the first to sixteenth aspects for controlling the robot arm.

According to a nineteenth aspect of the present invention, there is provided a robot arm controlling program for functioning a computer as an object property-concordant impedance setting means for setting a mechanical impedance set value of a robot arm based on information associated with a conveyance property of an object being conveyed by the robot arm; and an impedance controlling means for controlling a mechanical impedance value of the robot arm to the mechanical impedance set value set by the object property-concordant impedance setting means.

EFFECTS OF THE INVENTION

According to the robot arm controlling device and the robot including the robot arm controlling device the present invention, the mechanical impedance set value of the robot arm can be appropriately set according to the conveyance property of the object to be conveyed by the robot arm by including the object property database, the object property-concordant impedance setting means, and the impedance setting means, and thus safe robot control becomes possible where even when contacting a human, the human will not be damaged by the contact, and the robot arm will not move by such contact thus dropping the conveying object or contacting and damaging another human or another object.

Furthermore, according to the robot arm controlling method and program of the present invention, the mechanical impedance set value of the robot arm can be appropriately set and controlled according to the conveyance property of the object to be conveyed by setting the mechanical impedance set value of the robot arm based on information associated with the conveyance property of the object being conveyed by the robot arm and controlling the mechanical impedance value of the robot arm to the set mechanical impedance set value, and thus safe robot control becomes possible where even when contacting a human, the human will not be damaged by the contact, and the robot arm will not move by such contact thus dropping the conveying object or contacting and damaging another human or another object.

BRIEF DESCRIPTION OF DRAWINGS

These and other aspects and features of the present invention will become clear from the following description taken in conjunction with the preferred embodiments thereof with reference to the accompanying drawings, in which:

FIG. 4 is a view explaining a property list of an object property database;

BEST MODE FOR CARRYING OUT THE INVENTION

Figure 1:
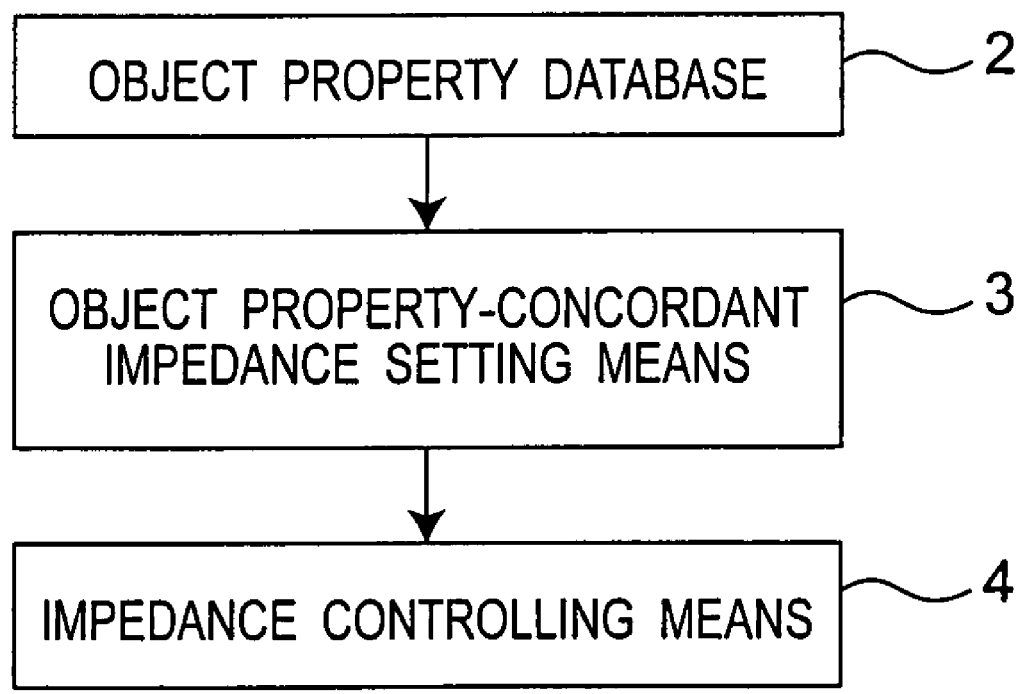
FIG. 1 is a block diagram showing the concept of a controlling device according to a first embodiment of the present invention.

Before the description of the present invention proceeds, it is to be noted that like parts are designated by like reference numerals throughout the accompanying drawings.

Before describing the embodiments of the present invention in detail with reference to the drawings, various aspects of the present invention will be described.

According to a first aspect of the present invention, there is provided a robot arm controlling device comprising: an object property database in which information associated with a conveyance property of an object being conveyed by the robot arm is recorded; an object property-concordant impedance setting means for setting a mechanical impedance set value of the robot arm based on the information of the object property database; and an impedance controlling means for controlling a mechanical impedance value of the robot arm to the mechanical impedance set value set by the object property-concordant impedance setting means.

According to a second aspect of the present invention, there is provided a robot arm controlling device as defined in the first aspect, characterized by further comprising an object property collecting means for collecting information associated with the conveyance property of the object being conveyed by the robot arm, and recording the collected information associated with the conveyance property of the object in the object property database.

According to a third aspect of the present invention, there is provided a robot arm controlling device as defined in the first or the second aspect characterized in that the impedance controlling means comprises a contact detecting means for detecting contact of a person or an object with the robot arm, and controls a mechanical impedance value of the robot arm to the mechanical impedance set value set by the object property-concordant impedance setting means when the robot arm contacts the person or the object.

According to a fourth aspect of the present invention, there is provided a robot arm controlling device as defined in the first or the second aspect characterized in that the property-concordant impedance setting means individually sets the mechanical impedance set value in six-dimensional directions in a translational direction and a rotational direction of an end effector of the robot arm based on the information of the object property database.

According to a fifth aspect of the present invention, there is provided a robot arm controlling device as defined in the fourth aspect characterized in that the property-concordant impedance setting means sets to maintain the object being conveyed by the robot arm horizontal with the translational direction of the end effector at low stiffness and the rotational direction at higher stiffness than the translational direction.

According to a sixth aspect of the present invention, there is provided a robot arm controlling device as defined in the first or the second aspect characterized in that the object property database includes physical property information of the object being conveyed by the robot arm, and the property-concordant impedance setting means sets the mechanical impedance set value based on the physical property information of the object property database.

According to a seventh aspect of the present invention, there is provided a robot arm controlling device as defined in the first or the second aspect characterized in that the object property database includes attribute information of the object being conveyed by the robot arm, and the property-concordant impedance setting means sets the mechanical impedance set value based on the attribute information of the object property database.

According to an eighth aspect of the present invention, there is provided a robot arm controlling device as defined in the sixth aspect characterized in that the object property database includes weight information of the object being conveyed by the robot arm as the physical property information of the object being conveyed by the robot arm, and the property-concordant impedance setting means sets the mechanical impedance set value based on the weight information of the object property database.

According to a ninth aspect of the present invention, there is provided a robot arm controlling device as defined in the sixth aspect characterized in that the object property database includes dimensional information of the object being conveyed by the robot arm as the physical property information, and the property-concordant impedance setting means sets the mechanical impedance set value based on the dimensional information.

According to a tenth aspect of the present invention, there is provided a robot arm controlling device as defined in the sixth aspect characterized in that the object property database includes hardness information of the object being conveyed by the robot arm as the physical property information, and the property-concordant impedance setting means sets the mechanical impedance set value based on the hardness information of the object property database.

According to an eleventh aspect of the present invention, there is provided a robot arm controlling device as defined in the sixth aspect characterized in that the object property database includes position and orientation restricting condition information of the object being conveyed by the robot arm as the physical property information, and the property-concordant impedance setting means sets the mechanical impedance set value based on the position and orientation restricting condition information of the object property database.

According to a twelfth aspect of the present invention, there is provided a robot arm controlling device as defined in the eleventh aspect characterized in that the position and orientation restricting condition information of the object in the object property database is position and orientation restricting information of the object set based on a relative relationship of positions and orientations of a plurality of objects simultaneously conveyed by the robot arm.

According to a thirteenth aspect of the present invention, there is provided a robot arm controlling device as defined in the eleventh aspect characterized in that the position and orientation restricting condition information of the object in the object property database is position and orientation restricting information of the object set based on surrounding environmental information of the object being conveyed.

According to a fourteenth aspect of the present invention, there is provided a robot arm controlling device as defined in the seventh aspect characterized in that the object property database includes degree of danger information of the object being conveyed as the attribute information of the object, and the property-concordant impedance setting means sets the mechanical impedance set value based on the degree of danger information of the object property database.

According to a fifteenth aspect of the present invention, there is provided a robot arm controlling device as defined in the fourteenth aspect characterized in that the degree of danger information of the object property database is degree of danger information set based on surrounding environmental information of the object being conveyed.

According to a sixteenth aspect of the present invention, there is provided a robot arm controlling device as defined in the seventh aspect characterized in that the object property database includes degree of importance information of the object being conveyed as the attribute information of the object, and the property-concordant impedance setting means sets the mechanical impedance set value based on the degree of importance information of the object property database.

According to a seventeenth aspect of the present invention, there is provided a robot arm controlling method characterized by comprising: setting a mechanical impedance set value of a robot arm based on information associated with a conveyance property of an object being conveyed by the robot arm; and controlling a mechanical impedance value of the robot arm to the set mechanical impedance set value.

According to an eighteenth aspect of the present invention, there is provided a robot characterized by comprising the robot arm and the robot arm controlling device according to any one of the first to sixteenth aspects for controlling the robot arm.

According to a nineteenth aspect of the present invention, there is provided a robot arm controlling program for functioning a computer as an object property-concordant impedance setting means for setting a mechanical impedance set value of a robot arm based on information associated with a conveyance property of the object being conveyed by the robot arm; and an impedance controlling means for controlling a mechanical impedance value of the robot arm to the mechanical impedance set value set by the object property-concordant impedance setting means.

The robot arm controlling device and controlling method, the robot, and the program according to the embodiments of the present invention will now be described in detail based on the drawings.

FIRST EMBODIMENT

FIG. 1 is a block diagram showing the concept of a robot arm controlling device 1 according to a first embodiment of the present invention. In FIG. 1, reference numeral 2 denotes an object property database for storing conveyance property information such as gripping property information including physical property information and attribute information as an example of object property data of a conveying object to be conveyed by a robot arm 5, as described later, such as an object (gripping object) 38 to be conveyed while being gripped, the database has a function of transmitting the property data of the object 38 to an object property-concordant impedance setting means 3 when the object 38 to be gripped is specified.

The physical property information is property information that is defined physically, in terms of physical properties, geometrically such as a shape, a size (dimension), weight or a temperature of the object, as examples.

The attribute information of the object is secondary property information derived from conceptual property or physical property such as a degree of danger or a degree of importance, as examples.

Reference numeral 3 denotes the object property-concordant impedance setting means for setting mechanical impedance set values, that is, set values of stiffness and viscosity of the robot arm 5 based on the property information associated with the gripping object in the object property database 2.

Reference numeral 4 denotes an impedance controlling means for performing impedance controlling operation for controlling the mechanical impedance value of each joint part of the robot arm 5 to the mechanical impedance set value set by the object property-concordant impedance setting means 3.

Figure 2:
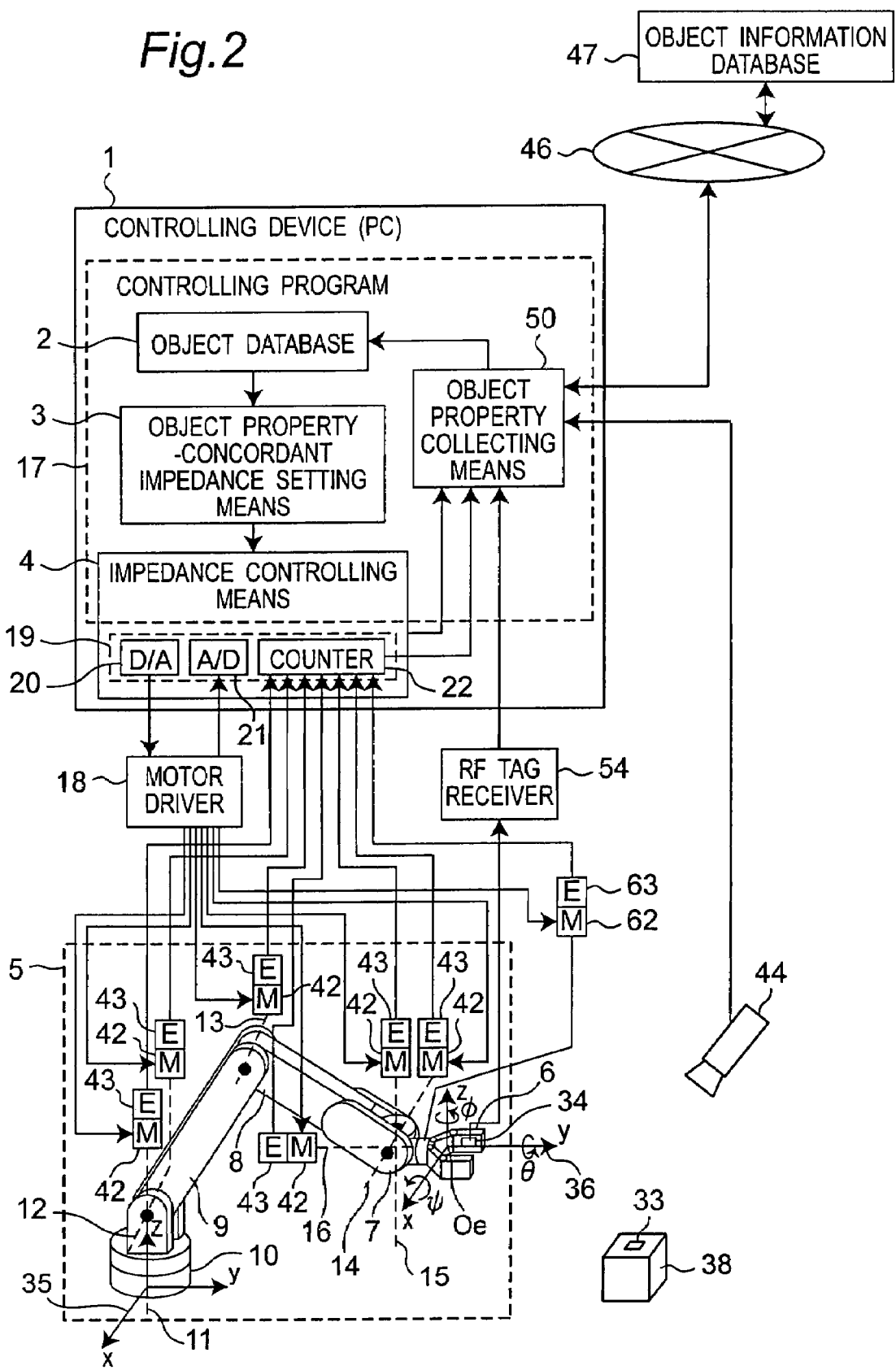
FIG. 2 is a view showing a hardware construction of the robot arm controlling device and a detailed configuration of the robot arm to be controlled, according to the first embodiment of the present invention.

FIG. 2 is a view showing a hardware construction of the robot arm controlling device 1 and a detailed configuration of the robot arm 5 to be controlled.

The controlling device 1 is configured by a typical personal computer in terms of hardware, and the object property database 2, the object property-concordant impedances setting means 3, and the portion other than an input/output IF (interface) 19 of the impedance controlling means 4 are realized as a controlling program 17 executed on the personal computer in terms of software.

The input/output IF 19 is configured by a D/A board 20, an A/D board 21, and a counter board 22 connected to an expansion throttle such as a PCI bus of the personal computer.

The controlling device 1 functions when the controlling program 17 for controlling the operation of the robot arm 5 is executed, where joint angle information outputted by an encoder 43, to be described later, of each joint part of the robot arm 5 is inputted into the controlling device 1 through the counter board 22, and a control command value in the rotating operation of each joint part is calculated by the controlling device 1. Each calculated control command value is provided to a motor driver 18 via the D/A board 20, and a motor 42, to be described later, of each joint part of the robot arm 5 is driven according to each control command value sent from the motor driver 18. A hand driving motor 62 (actually arranged inside a hand 6 of the robot arm 5) serving as one example of a hand drive device that is drive-controlled by the motor driver 18, and an encoder 63 (actually arranged inside the hand 6 of the robot arm 5) for detecting a rotation phase angle (i.e., joint angle) of a rotation shaft of the hand driving motor 62 are further arranged in the hand 6, where the rotation of the hand driving motor 62 is drive-controlled through the motor driver 18 by a control signal from a hand controlling means 200 of the impedance controlling means 4 of the controlling device 1 based on the rotation angle detected by the encoder 63, and the rotation shaft of the hand driving motor 62 is forward reverse rotated to open and close the hand 6.

The robot arm 5 is a multi-link manipulator having six degrees of freedom, and includes the hand 6, a forearm link 8 with a wrist part 7 to be attached with the hand 6, an upper arm link 9 rotatably coupled with the forearm link 8, and a platform part 10 rotatably coupled with and supporting the upper arm link 9. The platform part 10 may be fixed at a predetermined position, but may be coupled to a movable moving device so as to be movable. The wrist part 7 has three rotation axes of a fourth joint part 14, a fifth joint part 15, and a sixth joint part 16, and thus a relative orientation of the hand 6 with respect to the upper link 9 can be changed. That is, in FIG. 2, the fourth joint part 14 can change the relative orientation about the lateral axis of the hand 6 with respect to the wrist part 7, the fifth joint part 15 can change the relative orientation about the vertical axis orthogonal to the lateral axis of the fourth joint part 14 of the hand 6 with respect to the wrist part 7, and the sixth joint part 16 can change the relative orientation about the lateral axis orthogonal to the lateral axis of the fourth joint part 14 and the vertical axis of the fifth joint part 15 of the hand 6 with respect to the wrist part 7. The other end of the forearm link 8 is rotatable about the third joint part 13, that is, about the lateral axis parallel to the lateral axis of the fourth joint part 14 with respect to the distal end of the upper arm link 9; the other end of the upper arm link 9 is rotatable about the second joint part 12, that is, about the lateral axis parallel to the lateral axis of the fourth joint part 14 with respect to the platform part 10; and the upper side movable portion of the platform part 10 is rotatable about the first joint part 11, that is, about the vertical axis parallel to the vertical axis of the fifth joint part 15 with respect to the lower side fixed portion of the platform part 10. As a result, the robot arm 5 configures the multi-link manipulator of six degrees of freedom that is rotatable about the total of six axes.

Each joint part configuring the rotating portion of each axis includes a motor 42 (actually arranged inside each joint part of the robot arm 5) arranged on one of the members of each joint part and serving as one example of a rotation drive device that is drive-controlled by the motor driver 18, to be described later, and the encoder 43 (actually arranged inside each joint part of the robot arm 5) for detecting the rotation phase angle (i.e., joint angle) of the rotation shaft of the motor 42, where the rotation shaft of the motor 42 arranged on one of the motors is coupled to the other member and the rotation shaft is forward reverse rotated to rotate the other member about each shaft with respect to the one member.

Reference numeral 35 denotes an absolute coordinate system in which the relative positional relationship with respect to the lower side fixed portion of the platform part 10 is fixed, and 36 denotes an end effector coordinate system in which the relative positional relationship with respect to the hand 6 is fixed. Assuming the origin position Oe (x, y, z) of the end effector coordinate system 36 seen from the absolute coordinate system 35 is the end effector position of the robot arm 5, and (ø, θ, ψ) where the orientation of the end effector coordinate system 36 seen from the absolute coordinate system 35 is expressed by a roll angle, a pitch angle, and a yawing angle is the end effector orientation of the robot arm 5, the end effector position and the orientation vector are defined as vector $r=[x, y, z, ø, θ, ψ]^T$. Therefore, as an example, the vertical axis of the first joint part 11 is preferably parallel to the z-axis of the absolute coordinate system 35, and the lateral axis of the second joint part 12 can be preferably positioned parallel to the x-axis. Preferably, the lateral axis of the sixth joint part 16 can be positioned parallel to the x-axis of the end effector coordinate system 36, the lateral axis of the fourth joint arm 14 can be positioned parallel to the y-axis, and the vertical axis of the fifth joint part 15 can be preferably positioned parallel to the z-axis. Assuming that the rotation angle of the end effector coordinate system 36 with respect to the x-axis is the yawing angle ψ, the rotation angle with respect to the y-axis is the pitch angle θ, and the rotation angle with respect to the z-axis is the roll angle ø. The end effector position and orientation vector r follows the end effector position and orientation target vector $r_d$ when controlling the end effector position and the orientation of the robot arm 5.

Reference numeral 50 denotes an object property collecting means for collecting the property data of the object to be gripped by the robot arm 5, and inputting and updating the data to the object property database 2. Specifically, the object property collecting means 50 is inputted with image data from an image pick-up device 44 such as a camera, as described later, information on an RF tag 33 of the gripping object 38 read by a reading means 34 (e.g., an RF tag receiver 54), and object property data from an article information database 47 in an external web server through the Internet 46, and appropriately inputs and updates the inputted data or information to the object property database 2. The object property collecting means 50 is connected with the counter board 22, and is also inputted with joint angle information outputted by the encoder 43 of each joint part of the robot arm 5 and information on object weight etc. from the impedance controlling means 4.

Figure 14:
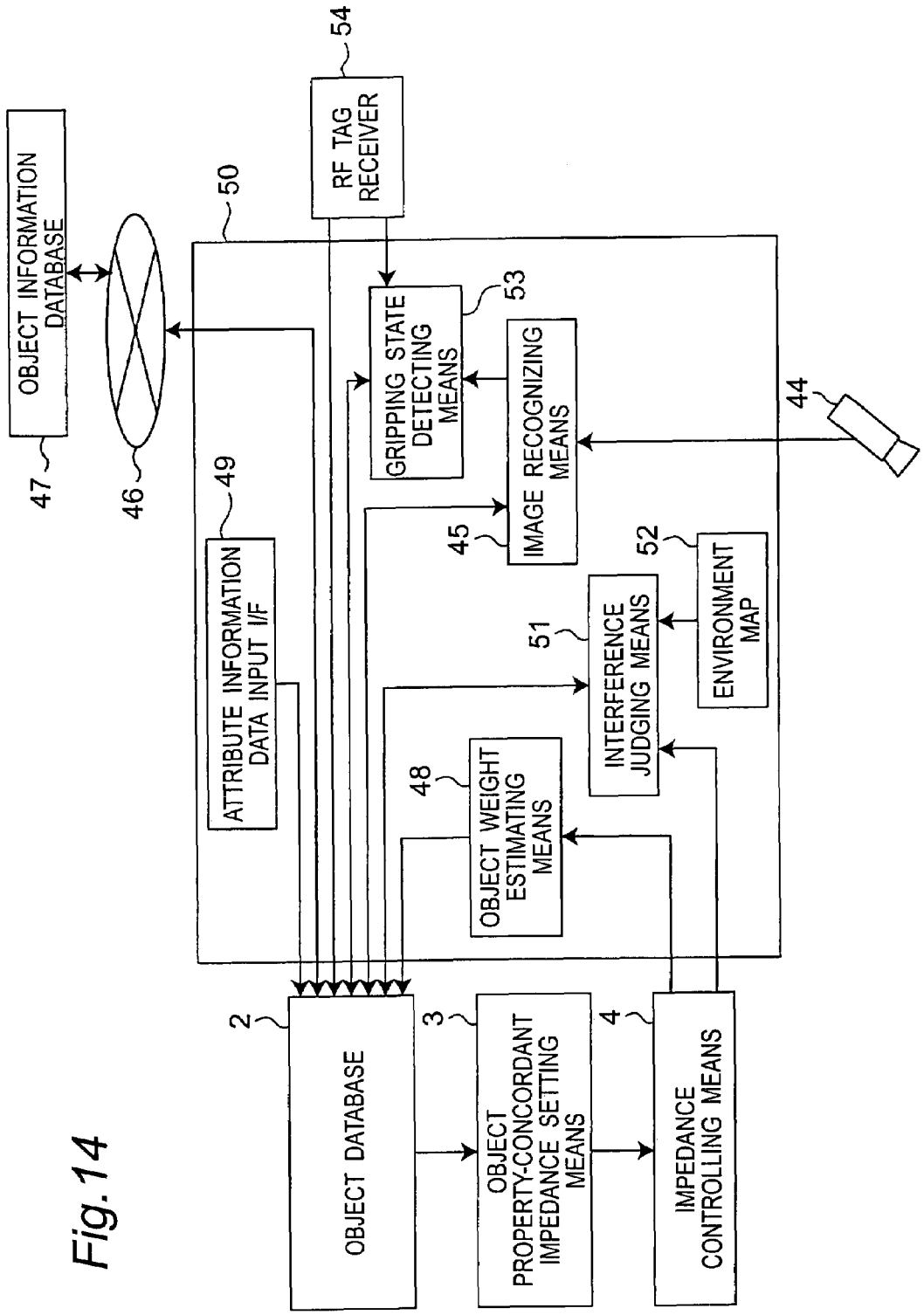
FIG. 14 is a block diagram illustrating the details of an object property collecting means according to the first embodiment of the present invention.

The details of the object property collecting means 50 are shown in FIG. 14.

Reference numeral 45 denotes an image recognizing means for performing image recognition with the image data of the image pick-up device 44 such as a camera, extracting the dimension of the gripping object 38, and outputting the same to the object property database 2. The image recognizing means 45 outputs the information on the relative positional relationship among a plurality of gripping objects obtained from the result of the image recognition by the image recognizing means 45 to a gripping state detecting means 53 serving as one example of a conveyance state detecting means to be described later.

Reference numeral 48 denotes an object weight estimating means for estimating the weight of the gripping object 38. For instance, when a force sensor is arranged in the wrist part 7 of the robot arm 5, the value obtained by subtracting the weight of the hand 6 from the measured value of the force sensor when the robot arm 5 is gripping the object and is in a stationary state is assumed as the object weight. When using a force estimating means 24 to be described later, the torque $\tau_{ext}$ generated at each joint part when the robot arm 5 is gripping the object and is in a stationary state is obtained from the force estimating means 24, and the torque necessary for the robot arm 5 to maintain the position and the orientation is obtained from the equation of motion of the robot arm and subtracted, where the torque value obtained therefrom is converted to the force that acts on the end effector and assumed as the object weight.

Reference numeral 49 denotes an attribute data input IF (interface) and is an interface that enables humans to input attribute data (attribute information) using an input device such as a keyboard, a mouse, and a microphone.

Reference numeral 51 denotes an interference judging means for judging interference relationship between the robot arm 5 and a wall, furniture, and the like based on environment map information stored in an environment map database 52 or a map of arrangement information of walls, furniture, and the like existing in the surrounding environment of the robot arm 5, and position and orientation information of the robot arm 5 inputted by the impedance controlling means 4, and setting and changing the attribute information of the object property database 2.

Reference numeral 53 denotes the gripping state detecting means serving as one example of a conveyance state detecting means that, when simultaneously gripping a plurality of gripping objects, assumes and detects the gripping state from the information of relative positional relationship of the plurality of gripping objects obtained from the result of the image recognition by the image recognizing means 45 and information of combination of ID information (ID data) such as an ID number of the gripping object obtained by the RF tag receiver 54. The gripping state detecting means 53 has a gripping state table showing the relationship between the combination of the objects and the gripping state, and assumes the gripping state with reference to the gripping state table when the combination of ID information is obtained. A plurality of general gripping rules in that the gripping state is such that an object is placed on a tray for a combination of the tray and another object is recorded in the gripping state table.

The object property collecting means 50 includes: the image recognizing means 45 connected with the image pick-up device 44 such as a camera and the object property database 2; the object weight estimating means 48 connected with the impedance controlling means 4 and the object property database 2; the interference judging means 51 connected with the impedance controlling means 4 and the object property database 2; the environment map database 52 connected with the interference judging means 51; the attribute data input IF (interface) 49 connected with the object property database 2 and the input device (not shown) such as a keyboard, a mouse, and a microphone; and the gripping state detecting means 53 connected with the RF tag receiver 54, the image recognizing means 45, and the object property database 2. The collecting means 50 exerts respective functions at the respective means and members, and has the function of inputting the information of the RF tag 33 of the gripping object 38 read by the RF tag receiver 54 to the object property database 2, accessing the article information database 47 in the external WEB through the Internet 46, and inputting the object property data to the object property database 2.

The details of the object property database 2 will now be described. Information associated with various objects 38 existing indoor where the robot arm 5 is installed is registered in advance in the object property database 2. The RF tag 33 is given to each object 38, and ID information such as an individual ID number is recorded in the RF tag 33. The reading means 34 (e.g., RF tag receiver 54) of the RF tag 33 is arranged in the hand 6 of the robot arm 5, where the hand 6 opens and closes by the rotational drive control of the hand driving motor 62 through the motor driver 18 by the control signal from the impedance controlling means 4 of the controlling device 1, and when the hand 6 of the robot arm 5 grips the object 38, the information of the RF tag 33 of the gripped object 38 is read by the reading means 34, the ID number of the gripped object 38 is specified by the reading means 34, and the ID number information of the gripped object 38 is inputted to the object property database 2 through the object property collecting means 50. The object property database 2 then sends the property data of the object 38 corresponding to the specified ID number to the object property-concordant impedance setting means 3.

The information held in the object property database 2 is recorded with the property data of each object in the form of property list 30 including physical property information and attribute information as shown in FIG. 4. As shown in FIG. 4, the property data of each object is configured by the ID number of each object, the weight information, dimensional information, and hardness information of the object serving as one example of the physical property information, as well as, degree of danger information serving as one example of the attribute information corresponding to the ID number. The data of the weight information, the dimensional information, the hardness information, and the degree of danger information are measured, evaluated, and stored in advance in the object property database 2 as database.

Regarding the dimensional information of the object property database 2, when the image pick-up device 44 and the image recognizing means 45 are arranged, it becomes possible that image recognition is performed by the image recognizing means 45 based on the image data obtained by the image pick-up device 44 to obtain the dimension of the object 38 and newly store or update the dimensional information in the object property database 2.

Regarding the weight information of the object property database 2, when a force sensor is arranged in the wrist part 7 of the robot arm 5 or the force estimating means 24 to be described later is used, the weight of the object 38 gripped by the robot arm 5 can be estimated by the object weight estimating means 48 and the weight information can be newly stored in the object property database 2. For instance, when pouring water in a pan gripped by the robot arm 5, the increase in weight of the object by the poured water can be estimated by the object weight estimating means 48, and the update of the weight information by increase and decrease of the weight can thus be performed.

Regarding the hardness information of the object property database 2, five-grade evaluation of levels 1 to 5 is performed according to the hardness of the gripping object 38. The evaluation value is made based on the material of the object 38, and for example, the object made of metal is "level 5" or the highest hardness, the object made of resin such as plastic is intermediate "level 3", the soft object such as paper and a towel is "level 1" or the lowest hardness, and recorded as the hardness information. The hardness can be evaluated in terms of breakability. As glass cups and ceramic ware, those being highly likely to break when hit against another object can be assumed as "level 5". Such hardness information is judged by humans in advance or automatically judged from the ID information recorded in the RF tag 33 of the object, and then the evaluation and the setting of levels are performed, and input is made to the object property database 2 through the attribute data input IF 49.

Regarding the degree of danger information of the object property database 2, for example, the information is recorded in evaluation values of five grades of level 1 to level 5. As a specific example of the evaluation value, the object such as an edged tool that is highly dangerous and that needs to be very carefully handled by the robot arm 5 is assumed as having the highest degree of danger of "level 5", and the object such as a document and a towel that is light, soft and does not damage a person even when hit by the person is assumed to have the lowest degree of danger or "level 1". Such degree of danger information is judged by humans, and then the evaluation and the setting of the level are performed, and input is made to the object property database 2 through the attribute data input IF 49. Alternatively, the degree of danger is set high when the object 38 to be gripped is near a wall surface or furniture, and judgment is made that there is a risk of interference between the object 38 to be gripped and the wall surface or the furniture by the interference judging means 51. Whether or not the object 38 to be gripped is close to the wall surface or the furniture is judged by, e.g., retrieving the positional information from the environment map database 52 when the positional information of the object 38 to be gripped is stored in the environment map information stored in the environment map database 52, and when the positional information is not stored in the environment map database 52, imaging the object 38 to be gripped with the image pick-up device 44 such as a camera, performing image recognition on the acquired image data by the image recognizing means 45, temporarily storing the data in the object property database 2, and estimating the positional information of the object 38 to be gripped by the interference judging means 51 with reference to the stored result of the image recognition.

Figures 8, 9, 10:
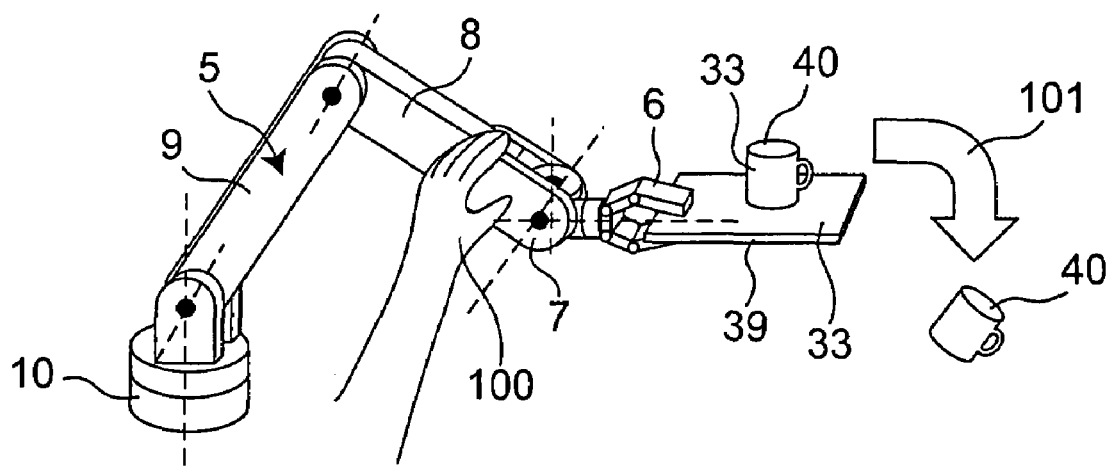
FIG. 8 is a view explaining a gripping rule table of an object property database.
FIG. 9 is a view explaining the gripping operation by the robot arm as the target of control of a controlling device of a robot arm according to a second embodiment of the present invention.
FIG. 10 is a view explaining another gripping rule table of the object property database.

Furthermore, for example, as shown in FIG. 9, in a case of such a gripping state that a tray 39 is gripped with the robot arm 5 and a cup 40 is placed on the tray 39, when the robot arm 5 and a human (e.g., hand 100) contact and the tray 39 is tilted, the cup 40 may fall as shown by the arrow 101 from the tray 39, and thus assumption is made by the gripping state detecting means 53 that the tray 39 is being conveyed with the cup 40 placed thereon and the degree of danger is set high when the RF tag 33 of the tray 39 and the RF tag 33 of the cup 40 are simultaneously detected by the RF tag receiver 54 in the detection of the gripping object using the ID information such as an ID number of the RF tag 33 by the RF tag receiver 54, or when the information that the cup 40 is placed on the tray 39 is obtained as relative positional relationship information from the result of image recognition by the image recognizing means 45 (see FIG. 14).

Regarding all information of the object property database 2, the object property data may be acquired by accessing the article information database 47 in an external web server etc. through the Internet 46 by the object property collecting means 50, so that the information in the object property database 2 can be updated.

The details of the object property-concordant impedance setting means 3 will now be described. In the object property-concordant impedance setting means 3, the setting of the mechanical impedance set value of the robot arm 5 is performed according to the gripping object 38 based on the conveyance property information of the object property database 2. The setting parameters of the mechanical impedance set value include inertia M, viscosity D, and stiffness K. The setting of each parameter of the mechanical impedance set value is carried out based on the following evaluation equation.

[Eq. 1]

$$M = KMm \times (\text{Weight[kg]}) + KM1 \times (\text{Dimension[m]}) + KMk \times (\text{Hardness}) + KMd \times (\text{Degree of danger}) \quad (1)$$

[Eq. 2]

$$D = KDm \times (\text{Weight[kg]}) + KD1 \times (\text{Dimension[m]}) + KDk \times (\text{Hardness}) + KDd \times (\text{Degree of danger}) \quad (2)$$

[Eq. 3]

$$K = KKm \times (\text{Weight[kg]}) + KK1 \times (\text{Dimension[m]}) + KKk \times (\text{Hardness}) + KKd \times (\text{Degree of danger}) \quad (3)$$

KMm, KMl, KMk, KMd, KDm, KDl, KDk, KDd, KKm, KKl, KKk, and KKd are gains in the above equations (1) to (3), and respectively take a certain constant value.

The object property-concordant impedance setting means 3 outputs the inertia M, the viscosity D, and the stiffness K of the mechanical impedance parameters calculated based on the equations (1), (2), and (3) to the impedance controlling means 4.

According to equations (1) to (3), for example, large inertia M is set by the equation (1) for the object having heavy weight by appropriately setting the gain KMm etc., and as a result of the robot arm 5 appearing heavy in proportion to the weight of the gripping object 38, large force is necessary to move the robot arm 5, where the robot arm 5 cannot be moved even when pushed lightly by hand (generated acceleration is small). On the other hand, small inertia M is set by the equation (1) for the object having light weight, and as a result of the robot arm 5 appearing heavy in proportion to the weight of the gripping object 38, the robot arm 5 can be moved easily with weak force (generated acceleration is large). In the case of the object such as edged tools for which the degree of danger is set high, the viscosity D and the stiffness K are set large, so that resistance feeling and rigidity are produced in the movement of the robot arm 5, and the robot arm 5 becomes difficult to move. In the case of the object such as towels for which the degree of danger is set low, the viscosity D and the stiffness K are set small, and thus the resistance feeling and rigidity are not produced in the movement of the robot arm 5, and the robot arm 5 can readily move.

When simultaneously gripping a plurality of objects, regarding the weight, the total weight obtained by adding all the weights of the objects being simultaneously gripped to each other is used to calculate the mechanical impedance set value.

Regarding the dimension, the largest dimension of the dimensions of the objects being simultaneously gripped is used to calculate the mechanical impedance set value.

Regarding the hardness, the highest hardness of the hardness of the objects being simultaneously gripped is used to calculate the mechanical impedance set value.

Regarding the degree of danger, the highest degree of the degrees of danger of the objects being simultaneously gripped is used to calculate the mechanical impedance set value.

Figure 3:
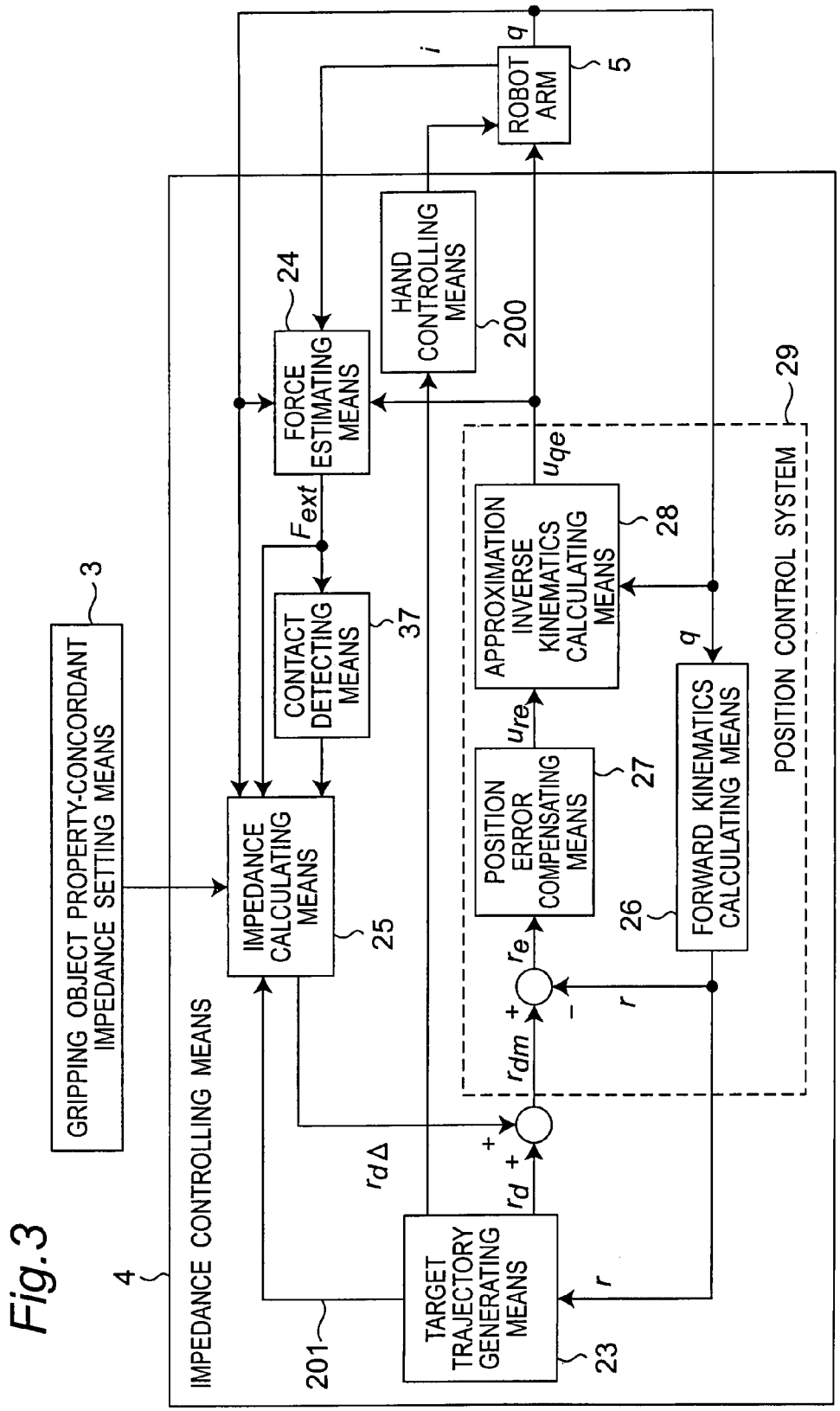
FIG. 3 is a block diagram showing an impedance controlling means of the controlling device according to the first embodiment of the present invention.

FIG. 3 is a block diagram of the impedance controlling means 4. The impedance controlling means 4 controls the value of the mechanical impedance of the robot arm to the mechanical impedance set value of the robot arm 5 set based on the set values of the inertia M, the viscosity D, and the stiffness K set by the object property-concordant impedance setting means 3.

The details of the impedance controlling means 4 will now be described based on FIG. 3. In FIG. 3, reference numeral 5 denotes the robot arm shown in FIG. 2, which is the target of control. The present values of the joint angles measured by the encoder 43 of each joint shaft (joint angle vector) vector $q=[q_1, q_2, q_3, q_4, q_5, q_6]^T$ is outputted from the robot arm 5, and received by the impedance controlling means 4 through the counter board 22. $q_1, q_2, q_3, q_4, q_5, q_6$ are respectively joint angles of the first joint part 11, the second joint part 12, the third joint part 13, the fourth joint part 14, the fifth joint part 15, and the sixth joint part 16.

Figure 13:
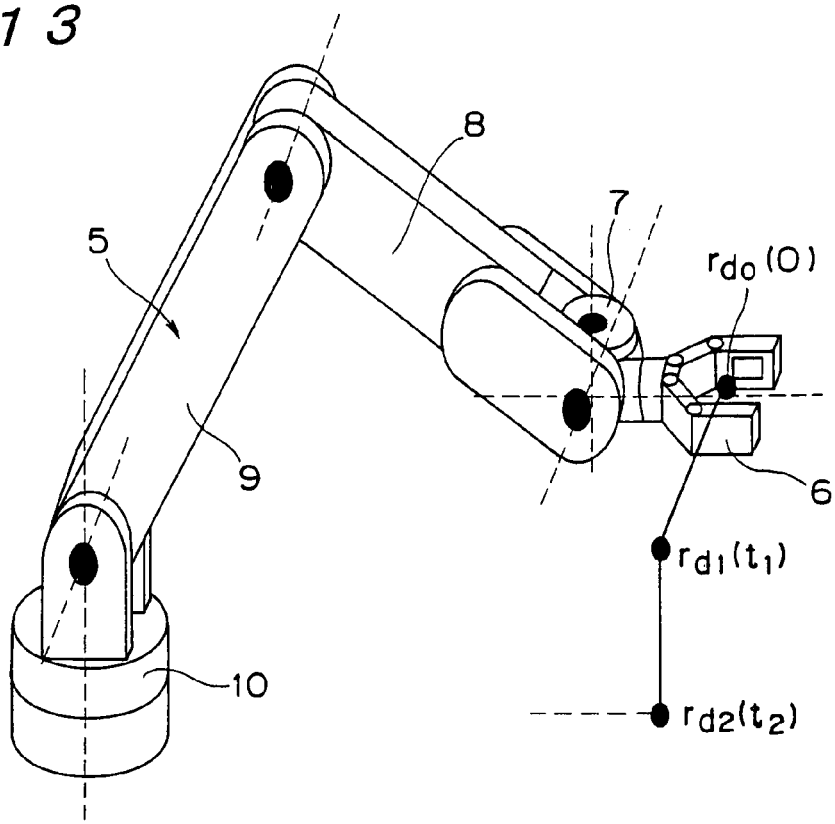
FIG. 13 is a view explaining a target trajectory of the robot arm controlling device according to the first embodiment of the present invention.

Reference numeral 23 denotes a target trajectory generating means for outputting the end effector position and orientation target vector $r_d$ for realizing the target operation of the robot arm 5. As shown in FIG. 13, the target operation of the robot arm 5 is provided with the position $(r_{d0}, r_{d1}, r_{d2}, \dots)$ for every point at time $(t=0\ t=t_1, t=t_2, \dots)$ in advance according to the target task, and the target trajectory generating means 23 uses polynomial interpolation to complement the trajectory between the respective points thereby generating the end effector position and orientation target vector $r_d$.

Reference numeral 24 denotes the force estimating means for estimating the external force applied to the robot arm 5 through contact between the human and the robot arm 5. The force estimating means 24 receives via the A/D board 21 current values $i=[i_1, i_2, i_3, i_4, i_5, i_6]^T$ flowing through the motor 42 for driving each joint part of the robot arm 5 measured with a current sensor of the motor driver 18, receives the present values q of the joint angles via the counter board 22, and receives a joint angle error compensation output $u_{qe}$ from approximation inverse kinematics calculating means 28, to be described later. The force estimating means 24 serves as an observer, where torque $\tau_{ext}=[\tau_{1ext}, \tau_{2ext}, \tau_{3ext}, \tau_{4ext}, \tau_{5ext}, \tau_{6ext}]^T$ generated at each joint part by the external force applied to the robot arm 5 is calculated from the current value i, the present values q of the joint angles, and the joint angle error compensation output $u_{qe}$ described above. The torque is converted to an equivalent end effector external force $F_{ext}$ at the end effector of the robot arm 5 by $F_{ext}=J_v(q)^{-T}\tau_{ext}-[0, 0, mg]^T$ and outputted. Here, $J_v(q)$ is a Jacobian matrix that satisfies, $$v=J_v(q)\dot{q} \quad [\text{Eq. 4}]$$

However, $v=[v_x, v_y, v_z, \omega_x, \omega_y, \omega_z]^T$, where $(v_x, v_y, v_z)$ is the translation speed of the end effector of the robot arm 5 in the end effector coordinate system 36, and $(\omega_x, \omega_y, \omega_z)$ is the angular speed of the end effector of the robot arm 5 in the end effector coordinate system 36. Furthermore, m is the weight of the object being gripped, and g is the gravitational acceleration of the object being gripped. The value of the weight m of the gripping object is available from the object property database 2. The gripping is actually performed by the robot arm 5, where the value of the weight m of the gripping object can be calculated from the result of estimation of the equivalent end effector external force $F_{ext}$ by the force estimating means 24.

Reference numeral 37 denotes a contact detecting means for observing the equivalent end effector external force $F_{ext}$ estimated by the force estimating means 24, and detecting the contact of the robot arm 5 with the human or other objects. When contact occurs, the equivalent end effector external force $F_{ext}$ changes, and thus the contact detecting means 37 detects that contact has occurred when the amount of change exceeds a certain value $\Delta F$. When the contact detecting means 37 detects the contact, the contact detecting means 37 notifies the impedance calculating means 25 that contact has been detected.

The impedance calculating means 25 is the portion enabling the robot arm 5 to realize the control of the value of the mechanical impedance of the robot arm to the mechanical impedance set value, and outputs 0 in normal operation where contact between the robot arm 5 and the human or another object is not detected by the contact detecting means 37. When the contact between the robot arm 5 and the human or another object is detected by the contact detecting means 37, and the notification is received from the contact detecting means 37, the end effector position and orientation target correction output $r_{d\Delta}$ for realizing the control of the value of the mechanical impedance of the robot arm to the mechanical impedance set value on the robot arms is calculated by the following equation (4) based on the inertia. M, the viscosity D, the stiffness K, which are the impedance parameters set in the object property-concordant impedance setting means 3, the present values q of the joint angles, and the external force $F_{ext}$ estimated by the force estimating means 24, to output the same. The end effector position and orientation target correction output $r_{d\Delta}$ is added to the end effector position and orientation target vector $r_d$ outputted from the target trajectory generating means 23 to generate an end effector position and orientation correction target vector $r_{dm}$.

[Eq. 5]

$$r_{d\Delta} = (s^2\hat{M} + s\hat{D} + \hat{K})^{-1} F_{ext} \quad (4)$$

where

[Eq. 6]

$$\hat{M} = \begin{bmatrix} M & 0 & 0 & 0 & 0 & 0 \\ 0 & M & 0 & 0 & 0 & 0 \\ 0 & 0 & M & 0 & 0 & 0 \\ 0 & 0 & 0 & M & 0 & 0 \\ 0 & 0 & 0 & 0 & M & 0 \\ 0 & 0 & 0 & 0 & 0 & M \end{bmatrix} \quad (5)$$

[Eq. 7]

$$\hat{D} = \begin{bmatrix} D & 0 & 0 & 0 & 0 & 0 \\ 0 & D & 0 & 0 & 0 & 0 \\ 0 & 0 & D & 0 & 0 & 0 \\ 0 & 0 & 0 & D & 0 & 0 \\ 0 & 0 & 0 & 0 & D & 0 \\ 0 & 0 & 0 & 0 & 0 & D \end{bmatrix} \quad (6)$$

[Eq. 8]

$$\hat{K} = \begin{bmatrix} K & 0 & 0 & 0 & 0 & 0 \\ 0 & K & 0 & 0 & 0 & 0 \\ 0 & 0 & K & 0 & 0 & 0 \\ 0 & 0 & 0 & K & 0 & 0 \\ 0 & 0 & 0 & 0 & K & 0 \\ 0 & 0 & 0 & 0 & 0 & K \end{bmatrix} \quad (7)$$

wherein s is a Laplace operator.

Reference numeral 26 denotes a forward kinematics calculating means inputted with the joint angle vector q which is the present value q of the joint angle measured by the encoder 43 of each joint shaft from the robot arm 5, and the forward kinematics calculating means 26 performs geometrical calculation of converting the joint angle vector q of the robot arm 5 to the end effector position and orientation vector r.

Reference numeral 27 denotes a position error compensating means that is inputted with an error $r_e$ between the end effector position and orientation vector r calculated by the forward kinematics calculating means 26 from the joint angle vector q measured in the robot arm 5 and the end effector position and orientation correction target vector $r_{dm}$ and the position error compensating means 27 outputs a position error compensation output $u_{re}$ to the approximate inverse kinematics calculating means 28.

In the approximate inverse kinematics calculating means 28, approximating calculation of inverse kinematics is performed by the approximate expression $u_{out}=J_r(q)^{-1}u_{in}$. $J_r(q)$ is a Jacobian matrix that satisfies the relationship $$\dot{r}=J_r(q)\dot{q},\qquad [\text{Eq. 9}]$$

$u_{in}$ is the input to the approximate inverse kinematics calculating means 28, and $u_{out}$ is the output from the approximate inverse kinematics calculating means 28, and the expression also becomes a conversion equation from the end effector position and orientation error $r_e$ to the joint angle error $q_e$ as in $q_e=J_r(q)^{-1}r_e$ assuming that the input $u_{in}$ is the joint angle error $q_e$. Therefore, when the position error compensation output $u_{re}$ is inputted to the approximate inverse kinematics calculating means 28, the joint angle error compensation output $u_{qe}$ for compensating the joint angle error $q_e$ is outputted from the approximate inverse kinematics calculating means 28 as the output.

The joint angle error compensation output $u_{qe}$ is provided to the motor driver 18 via the D/A board 20 as a voltage command value, whereby each joint shaft is forward and reverse rotation-driven by each motor 42 so that the robot arm 5 operates.

The principle of the impedance controlling operation of the robot arm 5 regarding the impedance controlling means 4 configured as above will now be described.

The impedance controlling operation is fundamentally the feedback control (position control) of the end effector position and orientation error $r_e$ by the position error compensating means 27, where the portion surrounded by a dotted line in FIG. 3 is a position control system 29. When a PID compensator is used, as examples, for the position error compensating means 27, the control is carried out so that the end effector position and orientation error $r_e$ converges to 0, thereby realizing the target impedance controlling operation of the robot arm 5.

When the contact detecting means 37 detects contact between the robot arm 5 and the human or another object, the end effector position and orientation target correction output $r_{d\Delta}$ is added to the position control system 29 described above by the impedance calculating means 25, and correction of the target value of the end effector position and the orientation is performed. The target value of the end effector position and the orientation is thus microscopically shifted from the original value in the position control system 29, and as a result, the operation of controlling the value of the mechanical impedance of the robot arm 5 to the appropriately set set value is realized. Since the end effector position and orientation target correction output $r_{d\Delta}$ is calculated by the equation (4), the operation of controlling the values of the mechanical impedance of the inertia M, the viscosity D, the stiffness K of the robot arm 5 to the appropriately set set value is realized.

The actual operation steps of the controlling program on the basis of the above principle will be described based on the flowchart of FIG. 5

In step 1, the joint angle data (joint variable vector or joint angle vector q) measured by the respective encoder 43 is inputted into the controlling device 1.

Next, in step 2, calculation of Jacobian matrix $J_r$ etc. necessary for the kinematics calculation of the robot arm 5 is performed by the approximate inverse kinematics calculating means 28.

Next, in step 3 (processing in the forward kinematics calculating means 26), the present end effector position and orientation vector r of the robot arm 5 is calculated by the forward kinematics calculating means 26 from the joint angle data (joint angle vector q) of the robot arm 5.

Next, in step 4, the end effector position and orientation target vector $r_d$ of the robot arm 10 is calculated by the target trajectory calculating means 23 based on the operation program of the robot arm 5 stored in advance in a memory (not shown) of the controlling device 1.

Next, in step 5 (processing in the force estimating means 24), the equivalent end effector external force $F_{ext}$ at the end effector of the robot arm 5 is calculated by the force estimating means 24 from the drive current value i of the motor 42, the joint angle data (joint angle vector q), and the joint angle error compensation output $u_{qe}$.

Next, in step 6 (processing in the contact detecting means 37), the presence of contact between the robot arm 5 and the human or another object is judged from the equivalent end effector external force $F_{ext}$ at the end effector of the robot arm 5 calculated by the force estimating means 24, and the process proceeds to step 7 if occurrence of contact is detected by the contact detecting means 37, and proceeds to step 7' if occurrence of contact is not detected.

Next, in step 7 (processing in the impedance calculating means 25), when detected that there is contact between the robot arm 5 and the human or another object by the contact detecting means 37, the end effector position and orientation target correction output $r_{d\Delta}$ is calculated by the impedance calculating means 25 from the inertia M, the viscosity D, and the stiffness K of the mechanical impedance parameters set in the object property-concordant impedance setting means 3, the joint angle data (joint angle vector q), and the equivalent end effector external force $F_{ext}$ applied to the robot arm 5 calculated by the force estimating means 24. The process then proceeds to step 8.

In step 7' (processing in the impedance calculating means 25), when detected that there is no contact between the robot arm 5 and the human or another object by the contact detecting means 37, the end effector position and orientation target correction output $r_{d\Delta}$ is set to 0 vector by the impedance calculating means 25. The process then proceeds to step 8.

In step 8 (processing in the position error compensating means 27), the error $r_e$ in the end effector position and the orientation which is the difference between the end effector position and orientation correction target vector $r_{dm}$, which is the sum of the end effector position and orientation target vector $r_d$ and the end effector position and orientation target correction output $r_{d\Delta}$, and the present end effector position and orientation vector r is calculated by the position error compensating means 27. A specific example of the position error compensating means 27 may be a PID compensator. The control is carried out such that the position error converges to 0 by appropriately adjusting three gains of proportion, differentiation, and integration each of which is diagonal matrix of constant number.

Next, in step 9 (processing in the approximation inverse kinematics calculating means 28), the position error compensation output $u_{re}$ is converted by the approximation inverse kinematics calculating means 28 to the joint angle error compensation output $u_{qe}$ or the value associated with the error of the joint angle from the value associated with the error of the end effector position and orientation by multiplying the inverse matrix of the Jacobian matrix $J_r$ calculated in step 2 by the approximation inverse kinematics calculating means 28.

Next, in step 10, the joint angle error compensation output $u_{qe}$ is provided to the motor driver 18 through the D/A board 20 from the approximation inverse kinematics calculating means 28, thereby changing the current amounts flowing through the respective motors 42 to generate the rotational motions of the respective joint shafts of the robot arm 5.

Step 1 to step 10 are repeatedly executed as calculation loop of control to realize the control of the operation of the robot arm 5, that is, the operation of controlling the value of the mechanical impedance of the robot arm 5 to the set value appropriately set.

Figure 6:
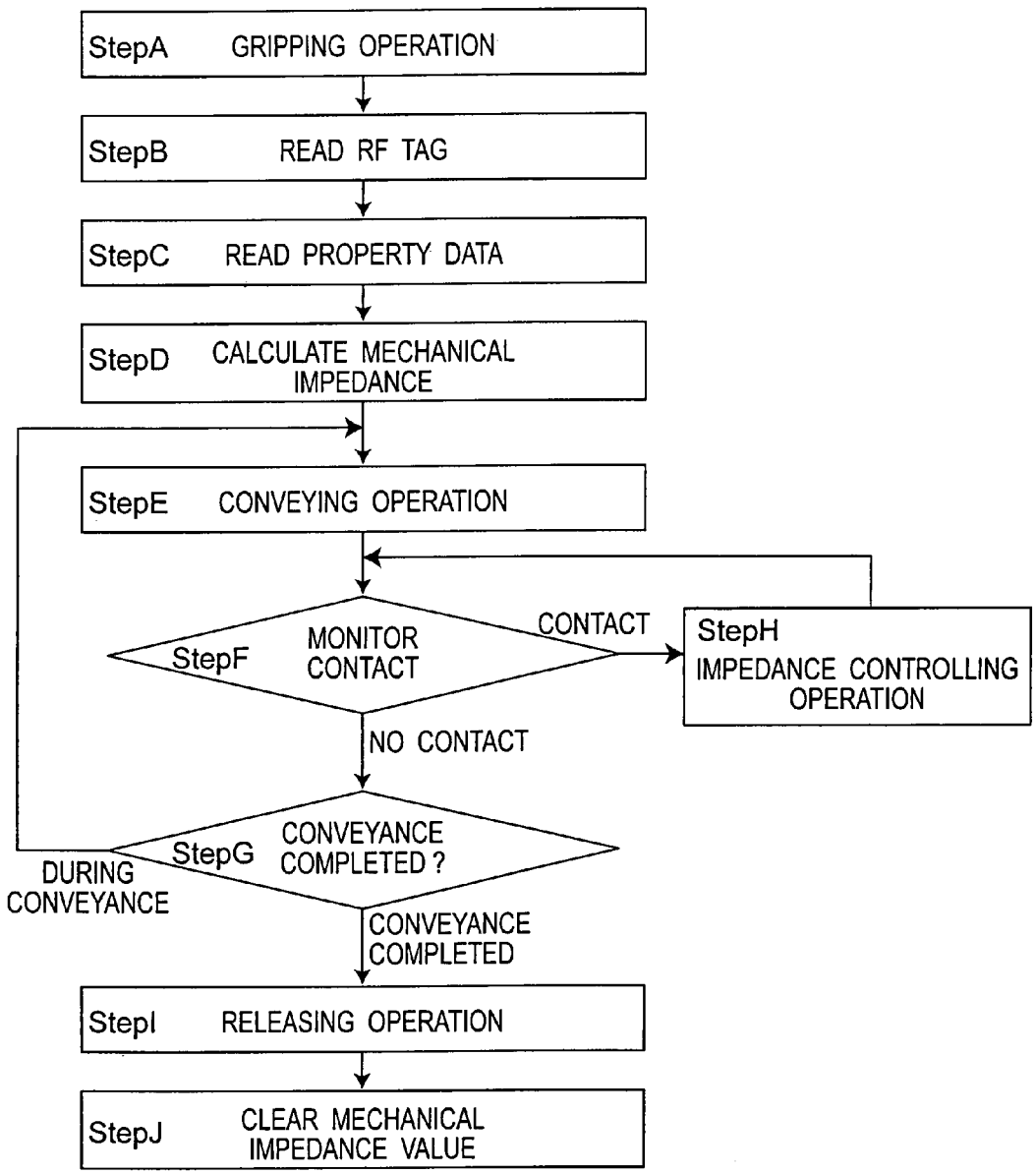
FIG. 6 is a flowchart showing overall operation steps of the controlling device according to the first embodiment of the present invention.

The overall operation of the controlling device 1 according to the first embodiment of the present invention will now be described based on the flowchart of FIG. 6 with the task of conveying the object 38 while gripped with the robot arm 5 as one specific example.

Figure 5:
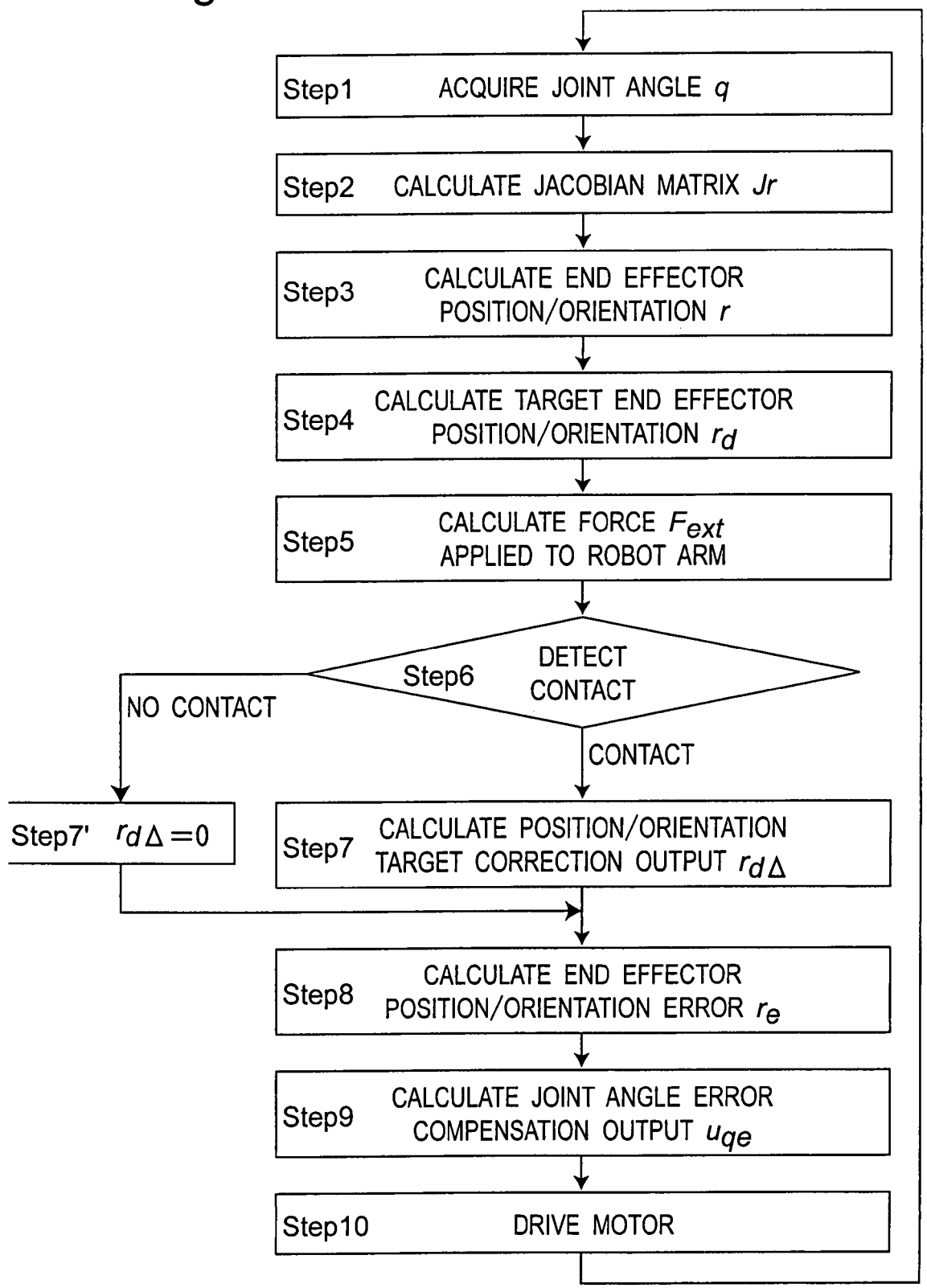
FIG. 5 is a flowchart showing operation steps of a controlling program in the impedance controlling means of the controlling device according to the first embodiment of the present invention.
Figure 7A:
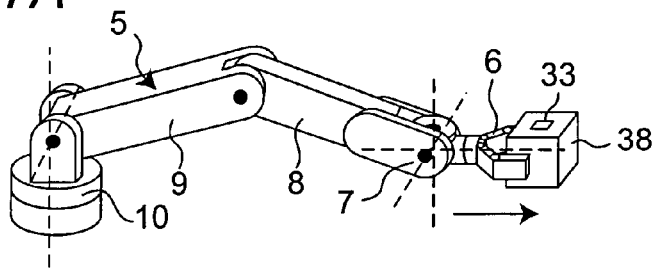
FIG. 7A is a view explaining the operation of the robot arm as the target of control of the controlling device according to the first embodiment of the present invention.

First, in step A, the target trajectory generating means 23 generates the target trajectory for gripping the object 38 with the hand 6 of the robot arm 5, the control of the end effector position and orientation of the robot arm 5 is executed according to the control flow through step 7' shown in FIG. 5 and the hand driving motor 62 is drive-controlled by the controlling device 1, so that the hand 6 approaches the object 38 in an opened state, the hand 6 is positioned at a position where the object 38 can be gripped, and the hand 6 is closed to grip the object 38 thereby realizing the gripping operation of the object 38 (see gripping operation shown in FIG. 7A). The positional information of the object 38 to be gripped necessary for generating the target trajectory is stored in advance in the environment map database 52, or is acquired using the image pick-up device 44 and the image recognizing means 45, as described above. Thus, when the robot arm 5 is fixed, the target trajectory for gripping the object 38 can be generated by the target trajectory generating means 23 from the information on the position where the robot arm 5 is fixed and the positional information of the object 38 to be gripped. When the robot arm 5 is moved by the moving device etc., the present positional information of the robot arm 5 with respect to a reference position is appropriately acquired, for example, using the image pick-up device 44 and the image recognizing means 45, and the target trajectory for gripping the object 38 is generated by the target trajectory generating means 23 from the acquired present positional information and the positional information of the object 38 to be gripped.

Next, in step B, the information of the RF tag 33 arranged on the object 38 is read by the RF tag receiver 54 arranged on the hand 6, and the ID information such as the ID number of the object 38 is specified by the RF tag receiver 54.

Next, in step C, the property data such as weight and dimension of the object 38 is read in the object property database 2 from the ID information such as the ID number read by the RF tag receiver 54, and transferred from the object property database 2 to the object property-concordant impedance setting means 3.

Next, in step D, the mechanical impedance set value that is concordant with the object 38 is calculated by the above equations (1) to (3) based on the property data transferred from the object property database 2 in the object property-concordant impedance setting means 3.

Figure 7B:
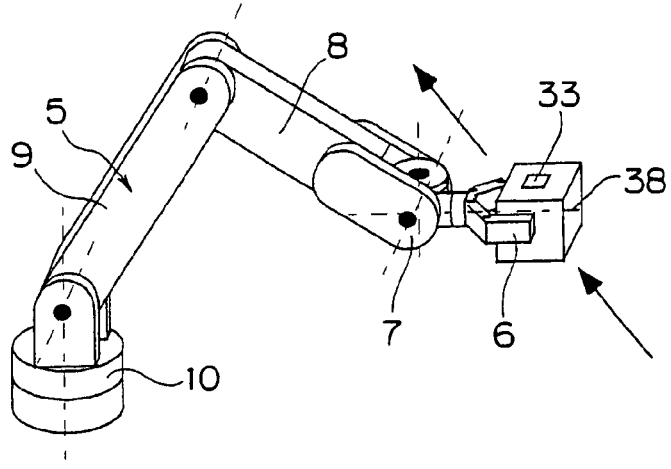
FIG. 7B is a view explaining the operation of the robot arm as the target of control of the controlling device according to the first embodiment of the present invention.

Next, in step E, the target trajectory for conveying the object 38 while being gripped by the hand 6 of the robot arm 5 is generated by the target trajectory generating means 23, and the control of the end effector position and orientation of the robot arm 5 is executed by the control flow through the step 7' shown in FIG. 5 to realize the conveying operation (see conveying operation shown with an arrow in FIG. 7B).

Figure 7C:
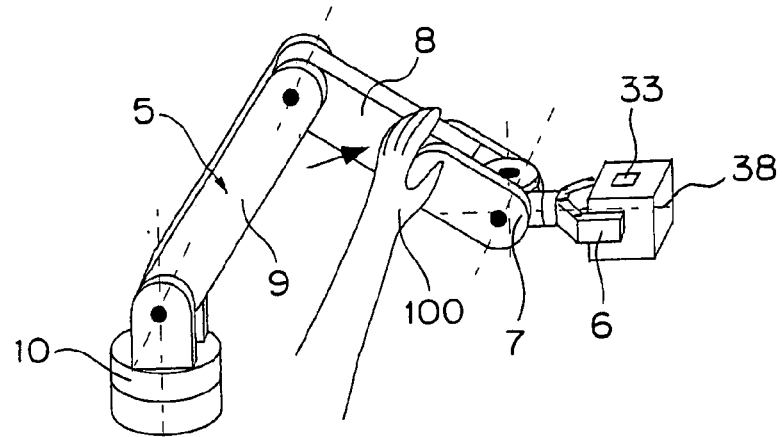
FIG. 7C is a view explaining the operation of the robot arm as the target of control of the controlling device according to the first embodiment of the present invention.

Next, in step F, whether or not the robot arm 5 is contacting a person or another object is detected by the contact detecting means 37 (detecting operation by the contact detecting means 37), where the operation proceeds to step G if the contact is not detected by the contact detecting means 37, and the operation proceeds to step H if the contact is detected by the contact detecting means 37 (when contacting operation between the hand 100 and the robot arm 5 shown in FIG. 7C is detected).

In step G, determination on whether or not the conveying operation is completed is made in the target trajectory generating means 23. When the conveying operation is not completed, the calculation of the target trajectory to the target position is continued and the conveying operation is continued, whereas when the conveying operation is completed, the calculation of the target trajectory to the target position is completed, the position of the destination is outputted as $r_d$, and the target position is judged to have been reached when the actual end effector position r of the robot arm 5 substantially matches $r_d$. When the object 38 is conveyed to the target position, that is, the destination, and the conveyance is completed, the process proceeds to step 1. When the conveying operation is not completed and is in the middle of conveyance, the conveying operation of step E is continued.

In step H, the impedance controlling operation for controlling the value of the mechanical impedance of the robot arm 5 so that the mechanical impedance value of the robot arm becomes the mechanical impedance set value calculated by the object property-concordant impedance setting means 3 is performed by the impedance controlling means 4 (operation in the impedance controlling means 4), and the impedance controlling operation is continued while the contact is being detected by the contact detecting means 37.

Figure 7D:
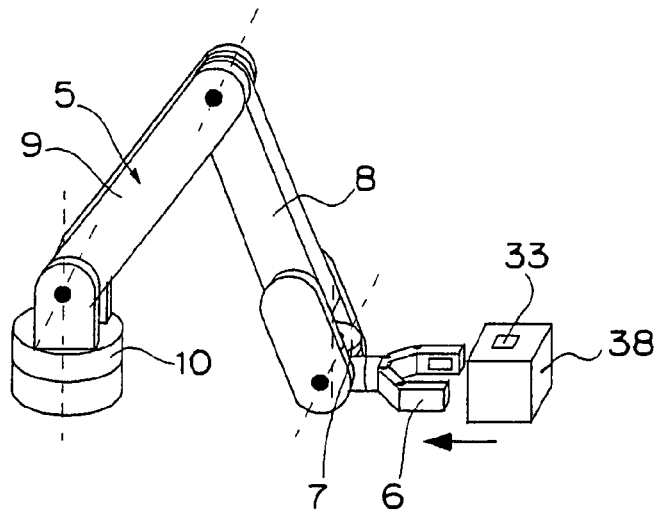
FIG. 7D is a view explaining the operation of the robot arm as the target of control of the controlling device according to the first embodiment of the present invention.

In step I, when conveyance of the gripping object 38 is completed, the hand 6 of the robot arm 5 opens by the control of the controlling device 1, and the object 38 is released from the gripped state (see gripping release operation shown in FIG. 7D).

Next, in step J, an operation completed notification signal 201 is outputted from the target trajectory generating means 23 to the impedance calculating means 25, and the set mechanical impedance set value is cleared by the impedance calculating means 25.

According to the operations step A to step J described above, the conveying task of the object by the robot arm 5 is realized, and the switch to the impedance controlling operation is made when contact is detected by the contact detecting means 37.

Therefore, by arranging the object property database 2, the object property-concordant impedance setting means 3, and the impedance controlling means 4, transition to the state of the impedance control is rapidly made from the state of position control of high stiffness when the contact between the robot arm 5 and the human or another object is detected by the contact detecting means 37, thereby ensuring safety (in other words, transition to a state in which flexibility is sufficiently exerted, so that the robot arm 5 flexibly moves through contact with the human and exhibit safety), and furthermore, the mechanical impedance set value of the robot arm 5 can be appropriately changed according to the property of the gripping object. Specifically, for instance, when conveying the tray with the cup placed thereon, control is performed such that the orientation of the end effector is maintained even if the robot arm 5 flexibly moves through contact with a person, whereby the tray is maintained horizontally, and the cup will not fall.

Figure 15:
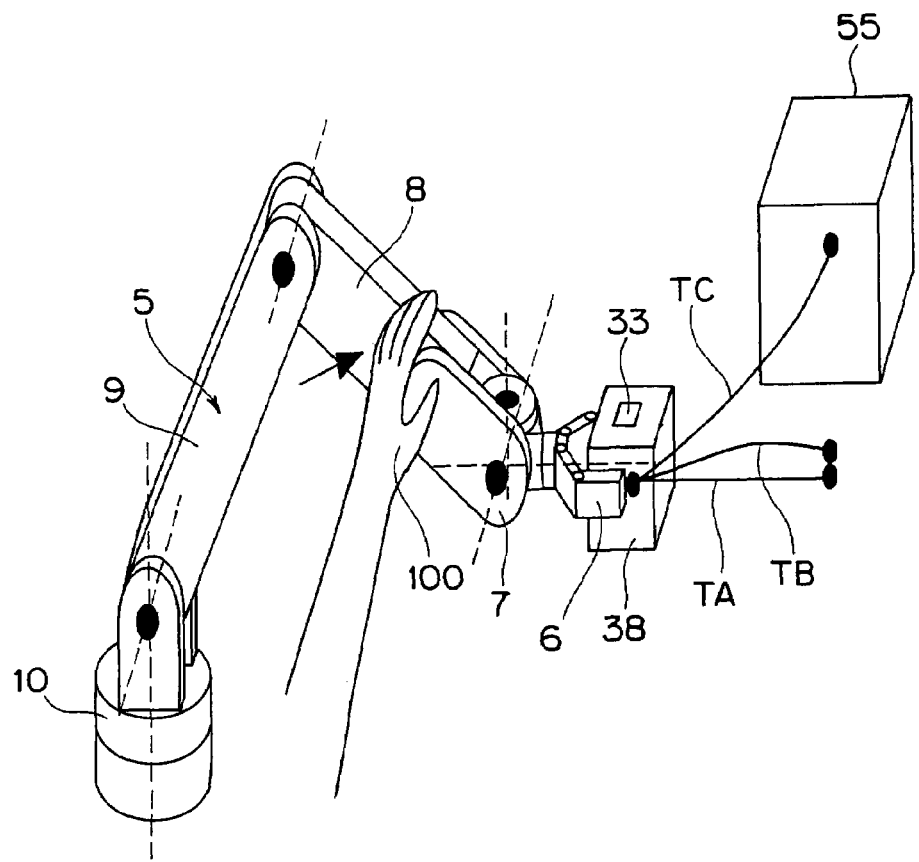
FIG. 15 is a view explaining the effects of the robot arm controlling device according to the first embodiment of the present invention.

Therefore, as shown in FIG. 15, when the contact with the human (e.g., hand 100) is detected by the contact detecting means 37, trajectory is as indicated by the trajectory TC with respect to the target trajectory TA of the end effector of the robot arm 5 when the setting of the appropriate mechanical impedance set value is not performed, and the impact between the object 38 gripped by the hand 6 of the robot arm 5 or the hand 6 and other objects such as furniture 55 may possibly occur, whereas when the setting of the appropriate impedance set value is performed as in the first embodiment, the amount of shift from the target trajectory TA can be made small as in the trajectory TB, and the possibility of impact between the object 38 gripped by the hand 6 of the robot arm 5 or the hand 6 and other objects such as furniture 55 can be avoided.

For instance, since the mechanical impedance set value of the robot arm 5 can be changed according to the weight of the gripping object 38, when a heavy object 38 is gripped by the hand 6, the spring property becomes stronger and the resistance becomes larger by setting the stiffness K by the property-concordant impedance setting means 3 so as to be proportional to the weight, that is, setting the gain KKm as KKm>0 by the property-concordant impedance setting means 3, and thus when the human pushes the robot arm 5 away with the hand 100, the possibility of moving the robot arm 5 more than necessary and thereby hitting the object 38 having heavy weight being gripped to other objects such as other furniture 55 or a plane can be reduced.

When the human pushes away the robot arm 5 with the hand 100, the human is able to sense the weight of the object 38, thereby preventing pushing with unnecessary force by setting the inertia M large by the property-concordant impedance setting means 3 so as to be proportional to the weight of the gripping object 38, that is, by setting the gain KMm as KMm>0 by the property-concordant impedance setting means 3.

Regarding the object 38 set to "level 5" of high degree of danger such as an edged tool as an example of the gripping object 38, the viscosity D will be set large according to the degree of danger by the property-concordant impedance setting means 3 by, for example, setting the set value of the gain KDd large by the property-concordant impedance setting means 3, whereby resistance caused by the viscosity is generated in the robot arm 5, the possibility that the edged tool etc. unprepared moves through the contact with human is prevented, and safety can be enhanced.

Furthermore, when gripping a pot with hot water as an example of the gripping object 38 and conveying the pot, for example, an infrared sensor (not shown) is arranged near the hand of the robot arm 5, whereby high temperature is detected by detecting the temperature with the infrared sensor, and the degree of danger data of the object property database 2 is set to "level 5", the highest degree of danger, by the property-concordant impedance setting means 3. Through such setting, the object property-concordant impedance setting means 3 and the impedance controlling means 4 set the viscosity large and perform control so that the robot arm 5 does not easily move, whereby even if pushed by the hand of the human, the robot arm 5 can be prevented from moving drastically and spilling the hot water.

With the controlling device 1 according to the first embodiment of the present invention, a controlling device that realizes safe robot control is provided where even when contacting the human, the human is not damaged by the contact, and the robot arm 5 is prevented from moving by such contact and dropping the gripping object 38 or contacting and damaging other humans or other objects.

SECOND EMBODIMENT

The basic configuration of a robot arm controlling device according to a second embodiment of the present invention is similar to that in the first embodiment shown in FIGS. 1 and 2, and thus the description on the common parts will be omitted, and only the different part will be described below in detail.

FIG. 8 is a view explaining a gripping rule table of the object property database 2. In addition to the property list 30 shown in FIG. 4, the object property database 2 includes a gripping rule table 31 in which restricting condition information of the position and orientation of the object is described as shown in FIG. 8. Items of position maintenance, orientation maintenance, and height maintenance are provided in the gripping rule table 31, and the numerical value of 1 or 0 is recorded in advance for each item.

When the item of orientation maintenance is 1, information on orientation restricting condition of fixing the object without moving the orientation is indicated, where the mechanical impedance set values in the rotating ($\varnothing$, $\theta$, $\psi$) direction at the end effector of the hand 6 of the robot arm 5 is set large by the property-concordant impedance setting means 3, and control is performed such that the orientation of the end effector, that is, the hand 6 is not easily changed.

In the case of the gripping state of gripping the tray 39 with the hand 6, and placing the cup 40 on the gripped tray 39, as shown in FIG. 9, the cup 40 may drop as indicated by the arrow 101 when the tray 39 tilts as a result of the contact between the robot arm 5 and the human, and thus the item of orientation maintenance of the gripping rule table 31 is set to 1 so as to maintain the orientation of the hand 6 or the end effector and so as to maintain the tray 39 horizontally.

The setting of the items of the gripping rule table 31 is performed based on the detection result of the gripping state detecting means 53. For instance, when the tray 39 and the cup 40 are detected by the RF tag receiver 54, the gripping state in which the cup 40 is placed on the tray 39 is assumed with reference to the griping state table, and the item of orientation maintenance of the gripping rule table 31 is set to 1.

Determination on whether being in the gripping state in which the tray 39 is gripped with the hand 6 and the cup 40 is placed on the tray 39 may be made through image recognition by the image recognizing means 45 of the image data acquired by the image pick-up device 44 (that is, when information that the cup 40 is placed on the tray 39 is obtained as relative positional relationship from the result of image recognition by the image recognizing means 45, determination may be made as being in the gripping state where the cup 40 is placed on the tray 39), and in the detection of the gripping object using the ID information such as the ID number by the RF tag, for example, the gripping state detecting means 53 assumes that the tray 39 is being conveyed with the cup 40 placed thereon when the tray 39 and the cup 40 are simultaneously detected, and the item of orientation maintenance is set to 1 when such gripping state is assumed by the gripping state detecting means 53, and such setting manner may be recorded in the gripping rule table 31 in advance.

When the item of position maintenance is 1, the mechanical impedance set value in the translational (x, y, z) direction at the hand 6 or the end effector of the robot arm 5 is set large by the property-concordant impedance setting means 3, and control is performed such that the position of the hand 6 or the end effector is not easily changed.

For instance, if furniture etc. is near the hand 6 or the end effector of the robot arm 5, and the hand 6 or the end effector may possibly hit the furniture etc. when advanced in the translational (x, y, z) direction, the item of position maintenance is set to 1, and such setting manner may be recorded in advance in the gripping rule table 31.

When the item of height maintenance is 1, the mechanical impedance set value in the z direction at the hand 6 or the end effector of the robot arm 5 is set large by the property-concordant impedance setting means 3, and the height at which the hand 6 or the end effector is positioned is maintained.

Figure 12:
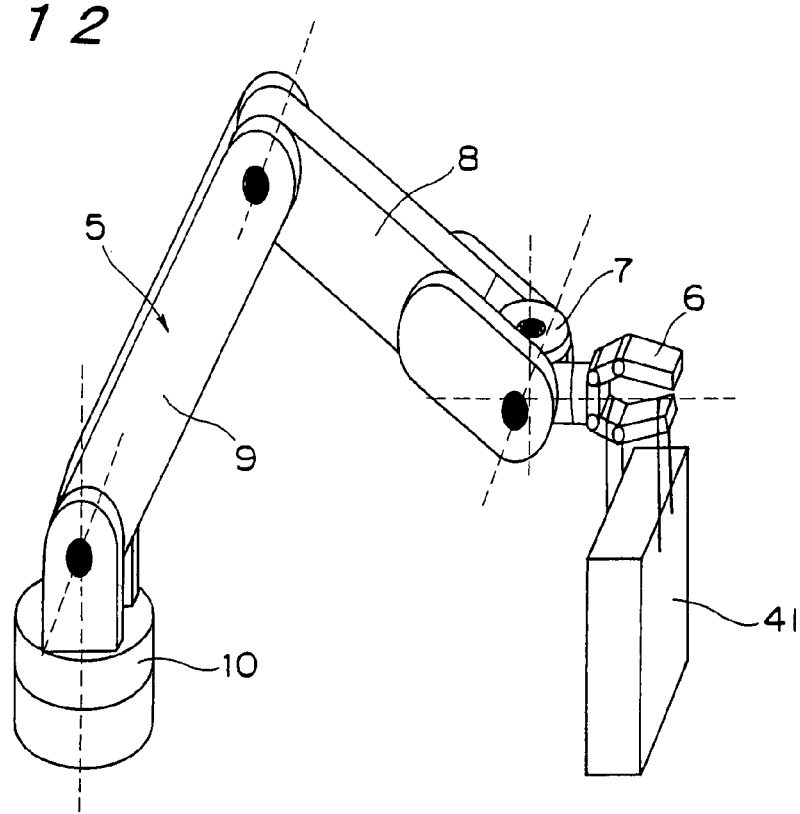
FIG. 12 is a view explaining another gripping operation by the robot arm as the target of control of a robot arm controlling device according to the second embodiment of the present invention.

As shown in FIG. 12, for example, in the gripping state where a bag 41 is hung and carried by the hand 6, since the bottom surface of the bag 41 might contact the floor if the end effector position of the hand 6 lowers, the item of height maintenance is set to 1, and such setting manner may be recorded in advance in the gripping rule table 31. In this case, the mechanical impedance set value in the −z direction, that is, downward in the vertical direction at the hand 6 or the end effector of the robot arm 5 is set large by the property-concordant impedance setting means 3, and control is performed such that the position of the hand 6 or the end effector is not easily lowered.

Next, a method of realizing the control of the mechanical impedance value of the robot arm to the mechanical impedance set value will be described below, taking the case of orientation maintenance by way of example.

The end effector position and orientation target correction output $r_{d\Delta}$ is calculated through the following equation (8) in the impedance calculating means 25.

[Eq. 10]

$$r_{d\Delta} = \alpha(s^2 \hat{M} + s\hat{D} + \hat{K})^{-1} F_{ext} \quad (8)$$

where

[Eq. 11]

$$\alpha = \begin{bmatrix} \alpha_x & 0 & 0 & 0 & 0 & 0 \\ 0 & \alpha_y & 0 & 0 & 0 & 0 \\ 0 & 0 & \alpha_z & 0 & 0 & 0 \\ 0 & 0 & 0 & \alpha_\phi & 0 & 0 \\ 0 & 0 & 0 & 0 & \alpha_\theta & 0 \\ 0 & 0 & 0 & 0 & 0 & \alpha_\varphi \end{bmatrix} \quad (9)$$

and ($\alpha_x$, $\alpha_y$, $\alpha_z$, $\alpha_\phi$, $\alpha_\theta$, $\alpha_\psi$) are impedance control coefficients.

When there is no contact between the robot arm 5 and the human etc. and is in a normal position control mode, all the components ($\alpha_x$, $\alpha_y$, $\alpha_z$, $\alpha_\phi$, $\alpha_\theta$, $\alpha_\psi$) of the impedance control coefficients are set to 0 by the property-concordant impedance setting means 3. Each component of the end effector position and orientation target correction output $r_{d\Delta}$ calculated by the impedance calculating means 25 with the equation (8) becomes 0, the correction of the end effector position and orientation target is not performed, and the impedance controlling means 4 operates as the position control system.

When the contact between the robot arm 5 and the human etc. occurs and such contact is detected by the contact detecting means 37, some of the components of the impedance control coefficients are changed by the impedance calculating means 25. For example, when the item of orientation maintenance of the gripping rule table 31 is 1 with reference to the gripping rule table 31 of the object property database 2 at the time of contact detection, the components ($\alpha_x$, $\alpha_y$, $\alpha_z$) corresponding to the position are switched to 1, and the components ($\alpha_\phi$, $\alpha_\theta$, $\alpha_\psi$) corresponding to the orientation are maintained at 0 by the property-concordant impedance setting means 3. The position (x, y, z) of the end effector is thus controlled by the impedance controlling means 4 so as to have the stiffness K, and the position control of the orientation (ø, θ, ψ) of the end effector is maintained by the impedance controlling means 4.

Therefore, for example, the mechanical impedance is set by the property-concordant impedance setting means 3 to the set value where the inertia M=0, D=0, and sufficient flexibility is exhibited as the stiffness K, whereby the position of the hand 6 or the end effector flexibly moves when the robot arm 5 and the human contact thereby exhibiting safety, and furthermore, when conveying the tray 39 with the cup 40 placed thereon, the tray 39 is maintained horizontal even if contact with the human occurs since the orientation of the hand 6 or the end effector is maintained, and thus the cup 40 will not be dropped.

Therefore, the control that simultaneously satisfies safety with respect to the gripping object and the external environment such as surrounding environment while ensuring safety with respect to the contact with the human can be achieved by controlling the mechanical impedance value of the robot arm 5 to the mechanical impedance set value by directions of the hand 6 or the end effector with the impedance control coefficients.

In the second embodiment, the gripping rule table 31 is as shown in FIG. 8, but is not limited thereto, and similar effects can be achieved in the form of specifying the position maintenance component, the orientation maintenance component, and the manner of operation of switching the mechanical impedance set value for each ± directions as shown in FIG. 10, and in addition, the operation of switching the mechanical impedance set value can be more precisely specified with the above form.

THIRD EMBODIMENT

The basic configuration of the controlling device according to a third embodiment of the present invention is similar to that in the second embodiment, and thus the description on the common parts will be omitted, and only the different parts will be hereinafter described in detail.

Figure 11:
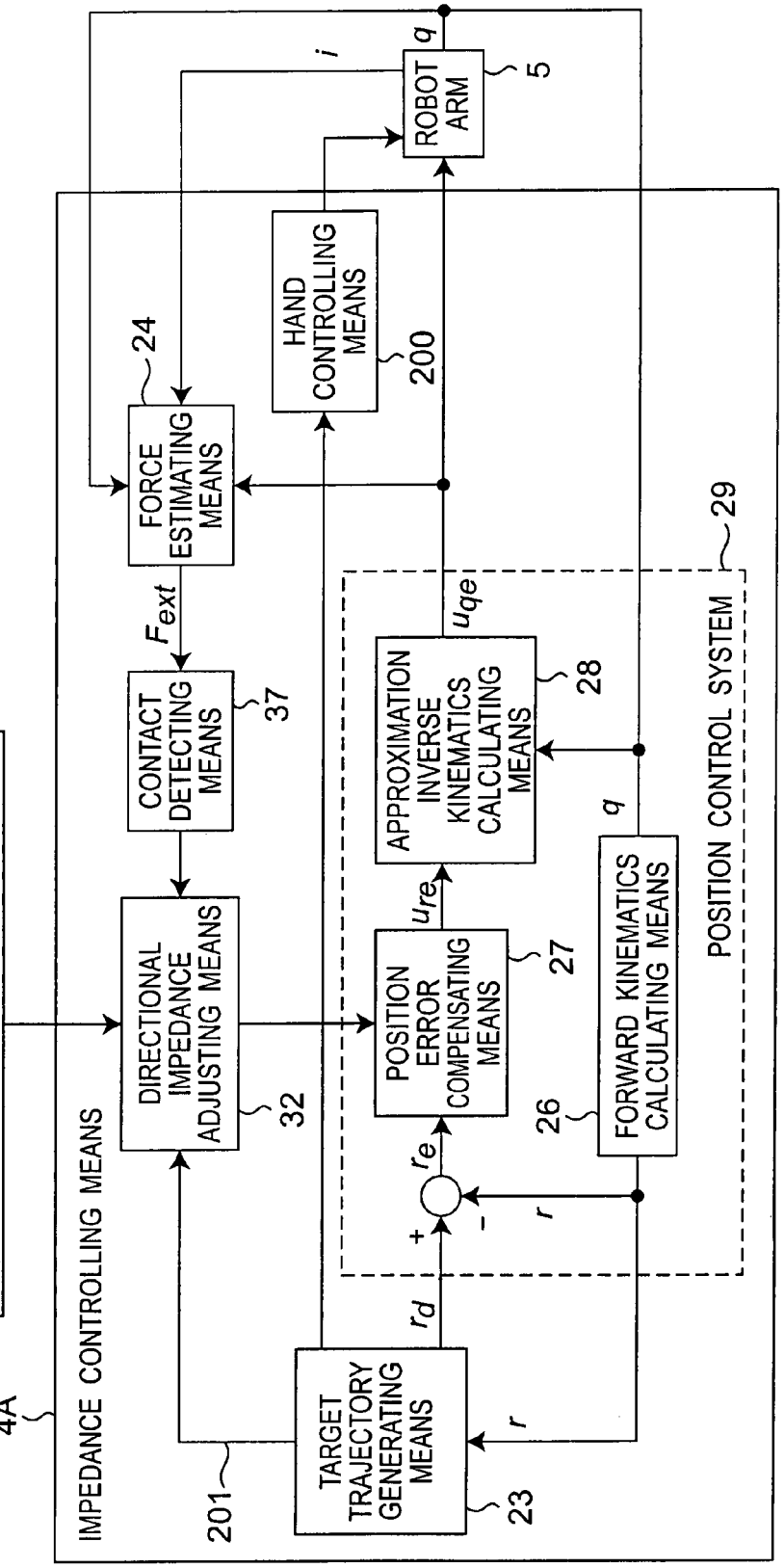
FIG. 11 is a view explaining a configuration of an impedance controlling means of a controlling device according to a third embodiment of the present invention.

FIG. 11 is a block diagram showing a configuration of an impedance controlling means 4A of a robot arm controlling device according to a third embodiment of the present invention. 32 denotes a directional impedance adjusting means having a function of adjusting the feedback gains of the position error compensating means 27 by directions based on the mechanical impedance set value set by the object property-concordant impedance setting means 3 and the gripping rule table 31 of the object property database 2.

In the object property-concordant impedance setting means 3 of the impedance controlling means 4A of the controlling device according to the third embodiment of the present invention, the setting of the stiffness K and the viscosity D is performed and the setting of the inertia M is not performed. The position error compensating means 27 is a PD compensator, where the position error compensation output $u_{re}$ is calculated by the following equation (10).

[Eq. 12]

$$u_{re} = K_P r_e + K_D \frac{dr_e}{dt} \quad (10)$$

where $K_P$ is a proportional gain matrix, $K_D$ is a differential gain matrix, and its diagonal components is a diagonal matrix configured by the gain for each component of the end effector position vector:

$$r = [x, y, z, \dot{\phi}, \dot{\theta}, \dot{\psi}]^t \quad [\text{Eq. 13}]$$

The control performance of the appropriate position and orientation can be obtained by adjusting (tuning) such gains.

The operation will now be described.

When the contact with the human or another object is not detected by the contact detecting means 37, the directional impedance adjusting means 32 does not operate, the position error compensating means 27 operates by the gains calculated in the equation (10), and the position control of the robot arm 5 is realized.

When the contact with human or another object is detected by the contact detecting means 37, the directional impedance adjusting means 32 adjusts the gains of the position error compensating means 27 based on the following equations (11) and (12).

[Eq. 14]

$$K'_P = \alpha K_P + (I-\alpha)\hat{K} \quad (11)$$

[Eq. 15]

$$K'_D = \alpha K_D + (I-\alpha)\hat{D} \quad (12)$$

where $\alpha$ is the impedance control coefficient obtained by the equation (9), and I is a unit matrix. Therefore, the position error compensation output $u_{re}$ of the position error compensating means 27 is calculated with the following equation (13) with the gains adjusted by the directional impedance adjusting means 32.

[Eq. 16]

$$u_{re} = K'_P r_e + K'_D \frac{dr_e}{dt} \quad (13)$$

According to the equation (13), when set as position maintenance, orientation maintenance, or height maintenance in the gripping rule table 31, the components of the corresponding directions of the diagonal components ($\alpha_x, \alpha_y, \alpha_z, \alpha_\phi, \alpha_\theta, \alpha_\psi$) of $\alpha$ are set as 1, and thus feedbacks by the gains $K_P$, $K_D$ for position control with respect to such directions are made and the robot arm 5 is in the position control mode operation.

In other direction components, the robot arm 5 is in the control mode based on the set values of the stiffness K and the viscosity D since the stiffness K and the viscosity D of the mechanical impedance set value set by the object property-concordant impedance setting means 3 are used. Therefore, if the stiffness K>$K_P$, the proportional gain of the position control of the corresponding direction becomes small at the time of contact, and the stiffness of the robot arm 5 lowers. If the viscosity D<$K_D$, the differential gain of the position control of the corresponding direction becomes small at the time of contact, and the viscosity of the robot arm 5 lowers.

In the case of the first embodiment described above, the set values of the stiffness K and the viscosity D are values themselves representing physical properties of stiffness and viscosity, but the stiffness K and the viscosity D of the third embodiment do not directly represent stiffness and viscosity, and pseudo-realize stiffness and viscosity by adjusting the gains. Therefore, the values at which appropriate stiffness and viscosity are obtained are searched while experimentally performing the adjustment for the specific numerical values of the stiffness K and the viscosity D in the third embodiment.

As described above, in the robot arm controlling device according to the third embodiment of the present invention, the mechanical impedance value of the robot arm 5 is pseudo-controlled to the mechanical impedance value set value by directions of the end effector by adjusting the gains of the position error compensating means 27 to achieve such control that simultaneously satisfies safety with respect to the gripping object and the external environment while ensuring safety with respect to the contact with the human.

In the first embodiment, the physical property information includes weight information, dimension information, and hardness information of the gripping object, but is not limited thereto, and may include other physical property such as temperature.

Furthermore, in the first embodiment, the attribute information is degree of danger information, but is not limited thereto, and may be other attribute information such as degree of importance information. When the degree of importance information is selected for the attribute information, the mechanical impedance set value of the robot arm 5 is set high when the importance is set high for precious articles such as commemorative objects, and thus the risk of breaking the precious article can be lowered.

The robot arm has been described in the above embodiments by way of example, but the present invention is not limited to the arm, and is also applicable to moving robots that move by wheels, two-legged robot, multi-legged walking robot, and the like, and similar effects are obtained regarding the contact between the moving robot etc. and the human.

By properly combining the arbitrary embodiments of the aforementioned various embodiments, the effects possessed by the embodiments can be produced.

INDUSTRIAL APPLICABILITY

The present invention is useful as a robot arm controlling device and controlling method, a robot equipped with the robot arm controlling device, and a robot arm controlling program, for performing control of the operation of the robot arm of the robot such as a household robot having possibility of contacting humans. The present invention is not limited to the household robots, and is also applicable to the controlling device and controlling method of the robot arm of industrial robots, a movable mechanism in production facilities etc., a robot equipped with the robot arm controlling device, and a robot arm controlling program thereof.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The invention claimed is:

1. A robot arm controlling device comprising:
an object property database in which information associated with a conveyance property of an object being conveyed by the robot arm is recorded;
an object property collecting means for collecting information associated with the conveyance property of the object being conveyed by the robot arm, and recording the collected information associated with the conveyance property of the object in the object property database;
an object property-concordant impedance setting means for setting a mechanical impedance set value of the robot arm based on the information of the object property database; and
an impedance controlling means for controlling a mechanical impedance value of the robot arm to the mechanical impedance set value set by the object property-concordant impedance setting means; wherein
the object property-concordant impedance setting means individually sets mechanical impedance set values in six-dimensional directions in a translational direction and a rotational direction of an end effector of the robot arm based on the information of the object property database, and sets to horizontally maintain the object being conveyed by the robot arm with a stiffness of the end effector in the rotational direction being higher than a stiffness of the end effector in the translational direction.

2. A robot arm controlling device comprising:
an object property database in which information associated with a conveyance property of an object being conveyed by the robot arm is recorded;
an object property-concordant impedance setting means for setting a mechanical impedance set value of the robot arm based on the information of the object property database; and
an impedance controlling means for controlling a mechanical impedance value of the robot arm to the mechanical impedance set value set by the object property-concordant impedance setting means; wherein
the object property database contains attribute information of the object being conveyed by the robot arm, the attribute information of the object including degree of danger information of the object being conveyed; and
the object property-concordant impedance setting means sets the mechanical impedance set value based on the degree of danger information of the object property database.

3. The robot arm controlling device according to claim 2, further comprising an object property collecting means for collecting information associated with the conveyance property of the object being conveyed by the robot arm, and recording the collected information associated with the conveyance property of the object in the object property database.

4. The robot arm controlling device according to claim 2, wherein the degree of danger information in the object property database is degree of danger information set based on surrounding environmental information of the object being conveyed.

5. A robot arm controlling device comprising:
an object property database in which information associated with a conveyance property of an object being conveyed by the robot arm is recorded;
an object property-concordant impedance setting means for setting a mechanical impedance set value of the robot arm based on the information of the object property database; and
an impedance controlling means for controlling a mechanical impedance value of the robot arm to the mechanical impedance set value set by the object property-concordant impedance setting means; wherein
the object property database contains attribute information of the object being conveyed by the robot arm, the attribute information of the object including degree of importance information of the object being conveyed; and
the object property-concordant impedance setting means sets the mechanical impedance set value based on the degree of importance information of the object property database.

6. The robot arm controlling device according to claim 5, further comprising an object property collecting means for collecting information associated with the conveyance property of the object being conveyed by the robot arm, and recording the collected information associated with the conveyance property of the object in the object property database.

* * * * *